(12) United States Patent
Mizutani et al.

(10) Patent No.: US 6,925,500 B1
(45) Date of Patent: Aug. 2, 2005

(54) CONTROL DEVICE, CONTROL METHOD AND MEDIUM

(75) Inventors: Masao Mizutani, Kanagawa (JP); Yukihiko Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 808 days.

(21) Appl. No.: 09/857,648

(22) PCT Filed: Oct. 10, 2000

(86) PCT No.: PCT/JP00/07034

§ 371 (c)(1),
(2), (4) Date: Jun. 5, 2001

(87) PCT Pub. No.: WO01/26296

PCT Pub. Date: Apr. 12, 2001

(30) Foreign Application Priority Data

Oct. 7, 1999 (JP) ............................... P11-286997

(51) Int. Cl.⁷ ......................................... G08F 15/173
(52) U.S. Cl. .................... 709/229; 709/226; 709/229; 709/203; 710/40; 725/59
(58) Field of Search ................... 709/200, 203, 709/216–218, 223, 226–229; 710/36–40; 725/58–59

(56) References Cited

U.S. PATENT DOCUMENTS

| | | | |
|---|---|---|---|
| 6,292,846 B1 * | 9/2001 | Hara et al. ...................... | 710/5 |
| 6,438,618 B1 * | 8/2002 | Lortz et al. .................. | 719/318 |
| 6,678,464 B1 * | 1/2004 | Kawai et al. .................. | 386/94 |
| 6,771,668 B2 * | 8/2004 | Fukunaga et al. .......... | 370/489 |

FOREIGN PATENT DOCUMENTS

| | | |
|---|---|---|
| JP | 11-41670 | 2/1999 |
| JP | 0 905 974 A2 | 3/1999 |
| JP | 11-195289 | 7/1999 |

* cited by examiner

*Primary Examiner*—Glenton B. Burgess
*Assistant Examiner*—Yasin Barqadle
(74) *Attorney, Agent, or Firm*—Frommer Lawrence & Haug LLP; William S. Frommer; Thomas F. Presson

(57) ABSTRACT

The using circumstances of a control object device are detected, and controlling of the control object device is carried out on the basis of the detected result. Thereby, where control equipment in conformity to a fixed standard, control equipment not in conformity to a fixed standard, and a control object device are mixed in a network, there can be avoided inconvenience in which the respective control equipment control the control object devices simultaneously.

20 Claims, 25 Drawing Sheets

| 0000 | ctype | subunit_type | subunit ID | opcode | operand[0] |
|---|---|---|---|---|---|
| operand[1] | | operand[2] | | operand[3] | operand[4] |
| operand[n] | zero pad bytes (if necessary) | | | | | transmitted first → transmitted last

FIG.9

| Value | Command type |
|---|---|
| 0 | CONTROL |
| 1 | STATUS |
| 2 | SPECIFIC INQUIRY |
| 3 | NOTIFY |
| 4 | GENERAL INQUIRY |
| 5-7 | Reserved for future specification |
| 8-$F_{16}$ | Reserved for response codes |

FIG.11

| Subunit type | Meaning |
|---|---|
| 0 | Video monitor |
| 1-2 | Reserved for future specification |
| 3 | disc recorder/player(audio or video) |
| 4 | tape recorder/player(audio or video) |
| 5 | Tuner |
| 6 | Reserved for future specification |
| 7 | Video camera |
| 8-1B$_{16}$ | Reserved for future specification |
| 1C$_{16}$ | Vendor unique |
| 1D$_{16}$ | Reserved for all subunit types |
| 1E$_{16}$ | subunit_type extented to next byte |
| 1F$_{16}$ | Unit |

FIG.12

| Subunit type | Meaning |
|---|---|
| 0-4 | Instance number |
| 5 | subunit_ID extented to next byte |
| 6 | Reserved for all instances |
| 7 | Ignore |

FIG.13

| Command priority | Stored priority |
|---|---|
| 0-1 | priority |
| $02_{16}$-$0E_{16}$ | priority&$0E_{16}$ |
| $0F_{16}$ | priority |

FIG.15

| Value | Response |
|---|---|
| 0-7 | Reserved for command types |
| 8 | NOT IMPLEMENTED |
| 9 | ACCEPTED |
| $A_{16}$ | REJECTED |
| $B_{16}$ | IN TRANSITION |
| $C_{16}$ | IMPLEMENTED/STABLE |
| $D_{16}$ | CHANGED |
| $E_{16}$ | Reserved for future specification |
| $F_{16}$ | INTERIN |

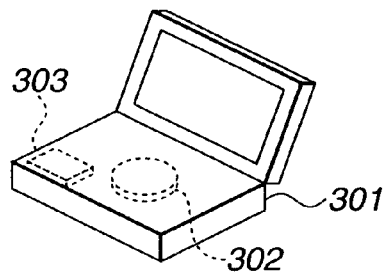
FIG.20A
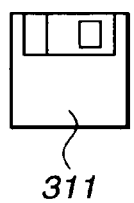  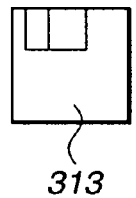 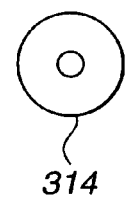
FIG.20B FIG.20C FIG.20D FIG.20E
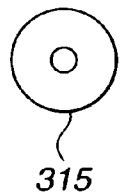 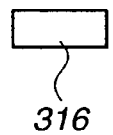
FIG.20F FIG.20G
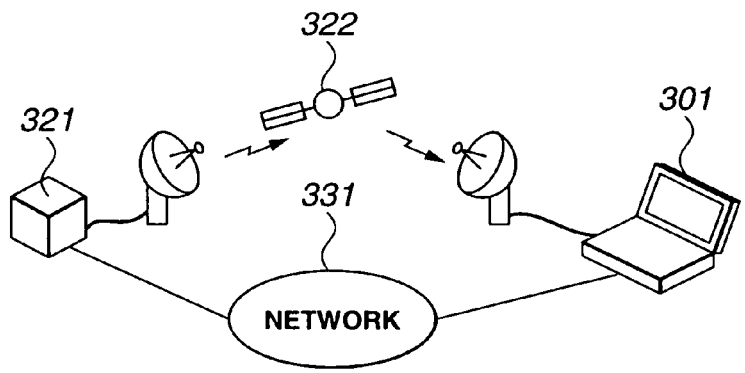
FIG.20H

| Device Type/Element | FAV | IAV | BAV | LAV |
|---|---|---|---|---|
| Java Runtime | ✓ | | | |
| DDI Controller | [✓] | [✓] | | |
| Resource Manager | ✓ | [✓] | | |
| Stream Manager | ✓ | [✓] | | |
| DCM Manager | ✓ | [✓] | | |
| Registry | ✓ | ✓ | | |
| Event Manager | ✓ | ✓ | | |
| Messaging System | ✓ | ✓ | | |
| 1394Communication Media Manager | ✓ | ✓ | | |
| HAVi SDD data | ✓ | ✓ | ✓ | |
| DCM | ✓ | [✓] | ✓ | ✓ |

FIG.22

CONTROL DEVICE, CONTROL METHOD AND MEDIUM

TECHNICAL FIELD

The present invention relates to control apparatus and method, medium, and to control apparatus and method, medium, for example, for carrying out the resource management when equipment connected to an IEEE1394 bus is controlled.

BACKGROUND ART

Recently, the IEEE (Institute of Electrical and Electronic Engineers) 1394 high speed serial bus has been popularized. A plurality of nodes (for example, such as a digital AV (audio visual) equipment can be connected to the IEEE (Institute of Electrical and Electronic Engineers) 1394 high speed serial bus (hereinafter merely referred to as IEEE1394 bus), and information can be delivered and received between the nodes. Out of nodes connected to the IEEE1394, the node for controlling other nodes is called a controller, and the node controlled by the controller is called a target.

In the transmission standard of IEEE1394, a signal format and an AV/C command for controlling equipment are provided. However, in the transmission standard of IEEE1394 alone, for example, where two pieces of digital AV equipment are connected one to one, no problem occurs, but where three pieces or more are connected one another, there gives rise to a problem. For example, where there is simultaneous control of three nodes or more, and there is a plurality of nodes (controllers) for controlling other equipment (target), there gives rise to a problem that it is difficult or realize to offer mediation between the control nodes (controllers) and to attain development of application softwares in which compatibility is present between nodes.

On the other hand, recently, for the purpose of making the most of characteristics of IEEE1394 capable of actually providing data transmission speed at a high speed and at relatively low cost and capable of solving the problem, the technique called HAVi (Home Audio/Video interoperability) has ben developed.

The HAVi will be described briefly hereinafter.

With the recent conspicuous growth of digital AV equipment market, it is expected that the time will come in future when users can connect the equipment to construct a network in individual home. Accordingly, in order that the equipment on the home network cooperate and operate, each equipment need be provided with a middle ware for control and management of the network. Further, even where equipment of different makers are connected, in order that the network normally operates and the equipment can be used mutually, a common specification to which the middle ware should conform is indispensable thereto.

The HAVi is contemplated as a specification for AV equipment corresponding to the home network making use of IEEE1394. The software in conformity to the HAVi functions as a middle ware arranged between an application and OS (Vendor Specific Platform) in collecting functions used in common for an application as shown in FIG. 21, and in digital AV equipment in conformity to the HAVi on which the former is mounted, mutual use between equipment and mutual utilization of function become enabled. The HAVi has characteristics having a plug and play, mutual operability of equipment, and expandability of a network. Accordingly, when equipment in conformity to HAVi is connected to a network, the software in conformity to HAVi immediately detects the connection of equipment automatically due to the pug and play function, whereby the procedure as the network is taken to realize the expandability with respect to the function of equipment connected.

That is, in the HAVi, a user merely connects various equipment, due to the plug and play function, by a digital interface such as IEEE1394 to enable construction of a home network. Accordingly, even where for example, new equipment is connected to or removed from the network, the equipment can communicate each other to recognize that the network be updated, so that the network can correspond to an arrangement of new equipment without stopping the function.

Further, in the equipment based on the HAVi specification, not only mutual connection and mutual operation between equipment but also co-owning of function between equipment on the network become enabled due to the mutual operability of equipment. For example, by operating certain equipment, it is possible to make use of function of other equipment not possessed by the former.

Furthermore, in the HAVi, the expansion of function is possible such that a new function used in a future new home network application is used on the home network already used by a user, due to the expandability of the network. That is, the specification of HAVi defines the function that usable application programs and user interface softwares in other equipment are incorporated into the own through the network to use them, enhancing the way of pleasure and the convenience of new AV equipment as home network equipment, and having the expandability corresponding to the function to be effective in future. Accordingly, where new equipment or function is developed, that equipment is merely connected to the network already constructed to enable operation thereof.

As described above, the HAVi is possible to detect or control equipment in conformity to HAVi despite the difference in equipment makers, and further, the HAVi application is possible to control individual devices in different equipment. For example, as equipment such as a digital VTR and an audiophile, there can be listed a tuner, a display, an Amp, a stream converter, a clock function, an internet access function, and a modem. According to HAVi, for example, these devices can be operated directly from an application such as a set top box (STB).

The HAVi specification is determined in order to correspond to various requests of the home network in the digital AV environment based on the IEEE1394, and the basic specification thereof defines the exchange of messages and events on the IEEE1394, the ability detection of devices over the whole network and registration, and softwares for management of a digital AV stream and control of devices. As a byte code of the HAVi, Java (Trademark) is employed in order to realize the devices on the network and functions thereof, without depending on a platform, and a bidirectional application and a user interface can be provided. The application in conformity to HAVi based on the Java is loaded on the device to enable download through the modem and the internet. Further, in the HAVi, a resource manager is loaded to process a conflict of the using right of devices, manage a scheduled event such as reserved telerecordings of digital VTR, and monitor a network whether or not a device is removed after registration.

Main software elements defined in the HAVi basic specification include, as shown in FIG. 21, CMM (IEEE1394 Communication Media Manager), EM (Event Manager), Registry, MS (Messaging System), DCM (Device Control Module), DCM manager, DDI controller (Data Driven Interaction Controller), SMGR (Stream Manager), and Resource Manager.

The CMM functions as an interface between the IEEE1394 and each software element.

The EM informs other software elements about the status change of the network (for example, equipment is newly connected to or disconnected from the network).

The MS functions as an API (Application Programming Interface) in which software elements of equipment on the network communicate each other. It is noted that API is an interface positioned between an application and OS or a middle ware.

The DCM control equipment. An application program controls equipment through the DCM. For this reason, the application program itself need not consider the difference between the individual equipment.

The DCM manager updates DCM. When new equipment is additionally connected to the network, DCM necessary for the equipment is newly added to automatically correspond to updating of the network.

The registry controls and store information about the software module.

The DDI controller takes charge of GUI (Graphical User Interface) of a display bock of equipment. This corresponds to a variety of displays from a display of a text alone to a display of graphics.

The SMGR monitors and manages a flow of stream data of IEEE1394 such as a picture and a voice or sound on the network.

The resource manager manages the resource of the network.

The HAVi classifies the device on the network into four categories, i.e. FAV (Full AV Device), IAV (Intermediate AV Device), BAV (Base AV Device), and LAV (Legacy AV Device).

That is, as shown in FIG. 22, the FAV is a device provided with all software elements (all elements marked by check marks in the figure) of HAVi; the IAV is a device provided with software elements (elements marked by check marks in the figure) other than the executing environment of the byte code of Java; the BAV is a device for supporting only HAVi SDD (HAVi Self Describing Device) data and DCM; and LAV is a device other than IEEE1394 not corresponding to HAVi or IEEE1394. It is noted that in the figure, softwares in which a check mark is surrounded by [ ] are option, indicating that the software element may not be provided as the case may be.

FIG. 23 shows one constitutional example of a case where these four categories of devices are connected to a IEEE1394 bus. In the FIG. 23 example, FAV an IAV enable control by DCM with respect to BAV and LAV.

Incidentally, there is contemplated a case where a target corresponding to LAV mentioned in HAVi capable of delivering and receiving an AV/C command of IEEE1394, a controller corresponding to LAV mentioned in HAVi capable of delivering and receiving an AV/C command of IEEE1394, and a controller corresponding to FAV and LAV mentioned in HAVi are present in the same network.

For example, where the controller corresponding to the LAV and the controller in conformity to the HAVi simultaneously control a single LAV on the network as a target, the LAV as the target is to be controlled by a plurality of controllers to possibly give rise to inconvenience.

For example, as shown in FIG. 24, where STB (Set Top Box) 202 which is LAV mentioned in HAVi, STB 201 which is FAV mentioned in HAVi, and digital VTR (for example, such as digital VHS) 203 which is LAV mentioned in HAVi are such that in the network connected by the IEEE1394 bus, both the STB 202 and STB 202 operate as a controller, and the digital VTR 203 is a target, when these two STB 201 and 202 attempt to carry out operation of the digital VTR 203 simultaneously, confliction occurs. That is, since STB 202 operated as a controller is LAV, it is not put under an obligation to have a resource manager, and since LAV is not a model in conformity to HAVi, it is not put under an obligation to carry out communication between controllers, thus giving rise to confliction. For example, where in the midst of telerecording by the digital VTR 203 by the control from one STB 201, a stop command is supplied from the other STB 202, the digital VTR 203 becomes stopped despite the telerecording is in the midst.

Accordingly, where a plurality of controllers capable of controlling a single target are present on the network, and a controller which is LAV not in conformity to HAVi is present in the controllers, there occurs inconvenience that the single target is controlled by the plurality of controllers unless some resource managements are carried out.

Also in the case of network as shown, for example, in FIGS. 25 to 27, in addition to the FIG. 24 example, confliction occurs.

That is, where a controller 208 which is FAV having FCM for LAV corresponding to a reserve command, a controller 207 which is FAV, and a target 209 which is LAV not corresponding to a reserve command are a network connected by IEEE1394 bus, as shown in the example of FIG. 25, since the target 209 is LAV and does not correspond to the reserve command, even if the controller should have a resource manager, resource management could not be done. Accordingly, when these two controllers 207 and 208 attempt to carry out operation of the target 209, confliction similar to that mentioned above occurs.

Where a controller 214 having FCM for BAV not corresponding to a reserve command, a controller 213 which is FAV, and a target 215 which is BAV not corresponding to a reserve command are a network connected by IEEE1394 bus, as shown in the example of FIG. 26, since the target 215 is BAV of a model in conformity to HAVi but does not correspond to the reserve command, even if the controller should have a resource manager, resource management could not be done. Accordingly, even if all the networks should be constructed by the model in conformity to HAVi, when these two controllers 213 and 214 attempt to carry out operation of the target 209, confliction similar to that mentioned above occurs.

Further, where in a network in which a controller 217 which is LAV without resource manager, a controller 2161 which is likewise IAV without resource manager, and a target 218 which is LAV or BAV (BAV having own DCM, FCM) are connected by IEEE1394 bus, as shown in the example of FIG. 27, the controllers make reservations at a target, since both the controllers 216 and 217 are LAV and have not source manager, the resource management cannot be done. Accordingly, when these two controllers 216 and 217 attempt to carry out operation of the target 218, confliction similar to that mentioned above occurs.

Where a control object device which is a target is under the control of single equipment which is a controller, all control request from other control equipment are eliminated whereby confliction of control between control equipment can be avoided. However, by the mere response of the elimination to the control requests, the aforementioned other control equipment cannot distinguish whether the state that the control equipment occupies the control object device or the state that the control object device cannot be controlled for separate reasons. For example, where the digital VTR 203 in the FIG. 24 example receives a control request of reproduction in a power-off state, it repeats a response representative of rejection despite control is not occupied by anybody. Accordingly, the control equipment is necessary to know the state of the control object device in further detail.

Further, in the case of a network constructed by merely by LAV on which a resource manager is not actually mounted, since the respective LAV has no resource manager representative of the occupied state of a control object device, it is not possible to know whether or not certain control equipment obtains possessory rights to control the control object device.

Moreover, in the case of a network system having no equipment in conformity to HAVi, since a function representative of the occupied state of the control object device is not present, the respective control equipment cannot know easily the occupied state of control of the control object device.

DISCLOSURE OF THE INVENTION

The present invention has been accomplished in view of the circumstances noted above, and has its object to provide a control apparatus and method, medium wherein even in the case where control equipment in conformity to a fixed standard, control equipment not in conformity to a fixed standard, and a control object device capable of being controlled by the control equipment are mixed on a network, inconvenience that these control equipment simultaneously control the control object device not in conformity to a fixed standard can be avoided.

The control apparatus and method according to the present invention detects the using circumstances of the control object device to control the control object device on the basis of the detected result whereby solving the above-mentioned problem.

As the above-described control object device, there can be listed, as examples, recording and or reproducing equipment, a digital versatile disc device, a digital video cassette recorder, a tape coder, a compact disc device, a minidisc device, office selecting equipment, an amplifier and so on.

Further, the control apparatus and method according to the present invention judges whether or not the control object device is usable on the basis of the detected result, and when judged to be unusable, an alarm signal is produced, the alarm signal capable of being displayed. In judging whether usable or unusable, it is possible to judge whether or not the control object device is usable on the basis of the result of decision of presence or absence of the setting of the possessory rights or of the detected result.

Further, in the control apparatus and method according to the present invention, the status change of the control object device is detected, and the using circumstances of the control object device is detected in accordance with the detected result of the status change. Or, the using circumstances of the control object device may be detected from the status itself of the control object device. As the status change of the control object device, there can be listed a change of a control status value of a disc device or a change of a control status value of a tape device or a change of a control status value of a semiconductor device, a change of a value of a record passage time counter or a change of a value of a reproducing passage time counter, a change of a value of a tape counter or a change of a field value or a change of a track number, and an office number as the status itself.

Furthermore, in the control apparatus and method according to the present invention, the detection of the using circumstances of the control object device can be carried out every given time. Further, the control apparatus and method according to the present invention decide the presence or absence of the setting of possessory rights with respect to the control object device, and when the decision of possessory rights with respect to the control object device cannot be done, the detection of the using circumstances of the control object device is also carried out. Further, whether or not the control object device is usable is judged on the basis of the result of decision of the presence or absence of the setting of the possessory rights or the detected result. The decision of the presence or absence of the setting of the possessory rights is carried out on the basis of a fixed standard. As the fixed standard, there can be listed an IEEE1394 Standard, and the network can be an IEEE1394 bus.

Further, in detecting the using circumstances, performed are that ON/OFF of a power supply of the control object device is judged, and in accordance with the result of the judgment of the state of a power supply, the using circumstances of the control object device is detected; that whether the control object device is recording and/or reproducing equipment is judged, and the using circumstances of the control object device is detected in accordance with the result of the equipment judgment; and that whether or not the control object device is office selecting equipment is judged, and the using circumstances of the control object device is detected in accordance with the result of the equipment judgment. When the control object device is the recording and/or reproducing equipment, whether or not the status of the recording and/or reproducing equipment is decided is judged whereby the using circumstances of the recording and/or reproducing equipment is detected, and when the control object device is the office selecting equipment, whether or not the office selecting status of the office selecting equipment is decided is judged whereby the using circumstances of the office selecting equipment is detected.

The control object device is one or all equipment except the own connected on the network.

Next, the medium according to the present invention causes an information processing apparatus to execute a program which includes a step of detecting the using circumstances of a control object device and a step of controlling the control object device on the basis of the result of the detection.

BRIEF DESCRIPTION OF THE DRAWINGS

FIG. 9 is a view used in explanation of a format of an AV/C command frame.

FIG. 11 is a view used in explanation of a command type.

FIG. 12 is a view used in explanation of a sub-unit type.

FIG. 13 is a view used in explanation of a sub-unit ID.

FIG. 15 is a view used in explanation of a priority stored.

FIGS. 20A to H are views used in explanation of a medium.

FIG. 22 is a view used in explanation of FAV, IAV, BAV, and LAV mentioned in HAVi.

BEST MODE FOR CARRYING OUT THE INVENTION

The preferred embodiments of the present invention will be describe hereinafter with reference to the drawings.

Figure 1:
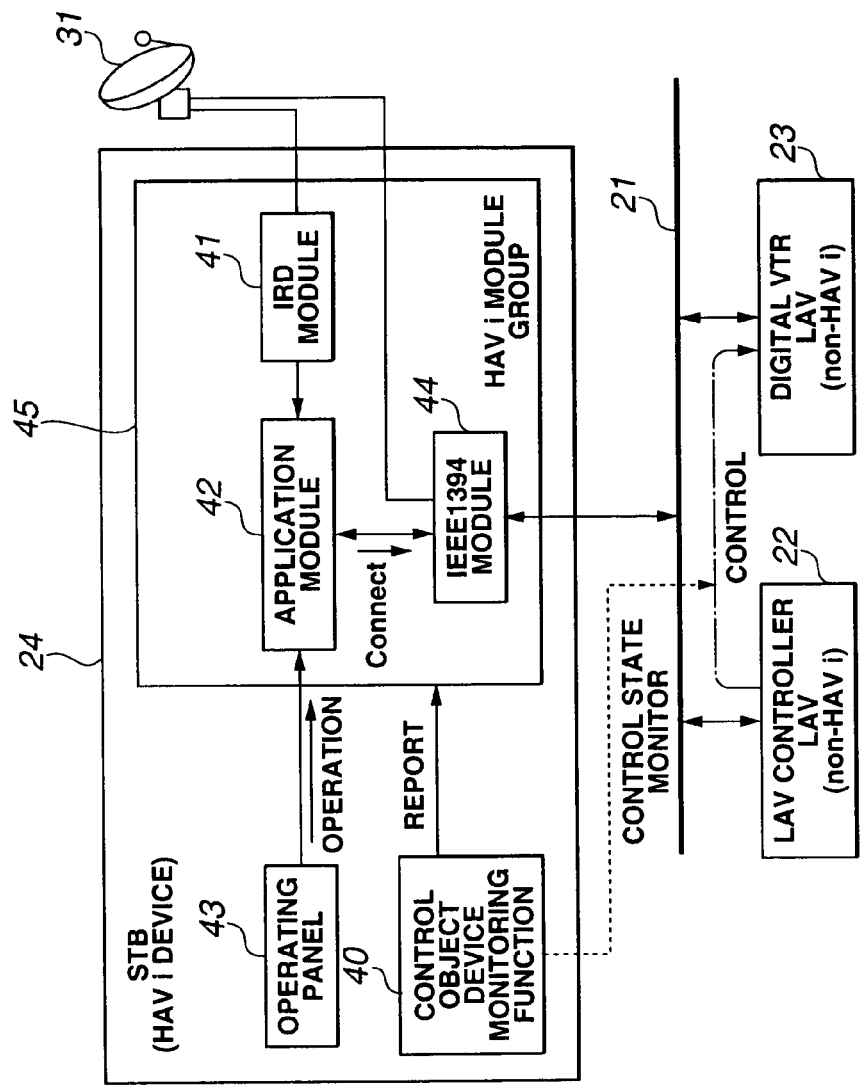
FIG. 1 is a view showing the constitution of a bus system to which the present invention is applied.

FIG. 1 shows one constitutional example of an IEEE1394 to which the present invention is applied. In this one constitutional example, a set top box (STB) 24 which is a device corresponding to FAV mentioned in HAVi and IAV corresponding to a resource manager, an LAV controller (for example, STB) 22 corresponding to LAV mentioned in HAVi, and a digital VTR (for example, a digital VHS tape recorder) 23 which is a device corresponding to LAV mentioned in HAVi are connected to an IEEE1394 bus 21. In FIG. 1, the digital VTR is shown as a control object device, which is however one example, and the present invention can be also applied to various recording and/or reproducing devices, for example, such as a digital versatile disc or digital video disc (DVD) device, a digital video cassette recorder, a tape coder, and a minidisc (MD) device, a reproducing device such as a compact disc (CD) device, and others such as a semiconductor device, an office selecting device (tuner), an amplifier (Amp) and so on.

In this constitution, the digital VTR 23 is a target, and the set top box 24 and the LAV controller 22 are controllers for controlling the digital VTR 23.

The set top box 24 receives an electric wave broadcast from a satellite not shown through a parabola antenna 31 to output it to an IRD (Integrated Receiver/Decoder) module 41. The IRD module 41 decodes and processes a signal supplied from the parabola antenna 31. An application module 42 controls The IRD module 41 and an IEEE1394 module 44 in response to an operating signal generated when a remote controller (not shown) or an operating panel 43 provided on the main body of the set top box 24 is operated by a user. The IEEE1394 module 44 executes interface processing with respect to the IEEE1394 bus 21. The application module 42, the IRD module. 41, and the IEEE1394 module 44 are respectively modules in conformity to HAVi, and in FIG. 1, the modules in conformity to HAVi are shown collectively as a HAVi module group 45.

Further, the set top box 24 is provided with a control object device monitoring function section 40 for monitoring the control status of a control object device such as LAV connected to the IEEE1394 bus 21. The detailed operation of the control object device monitoring function section 40 will be described later.

Figure 2:
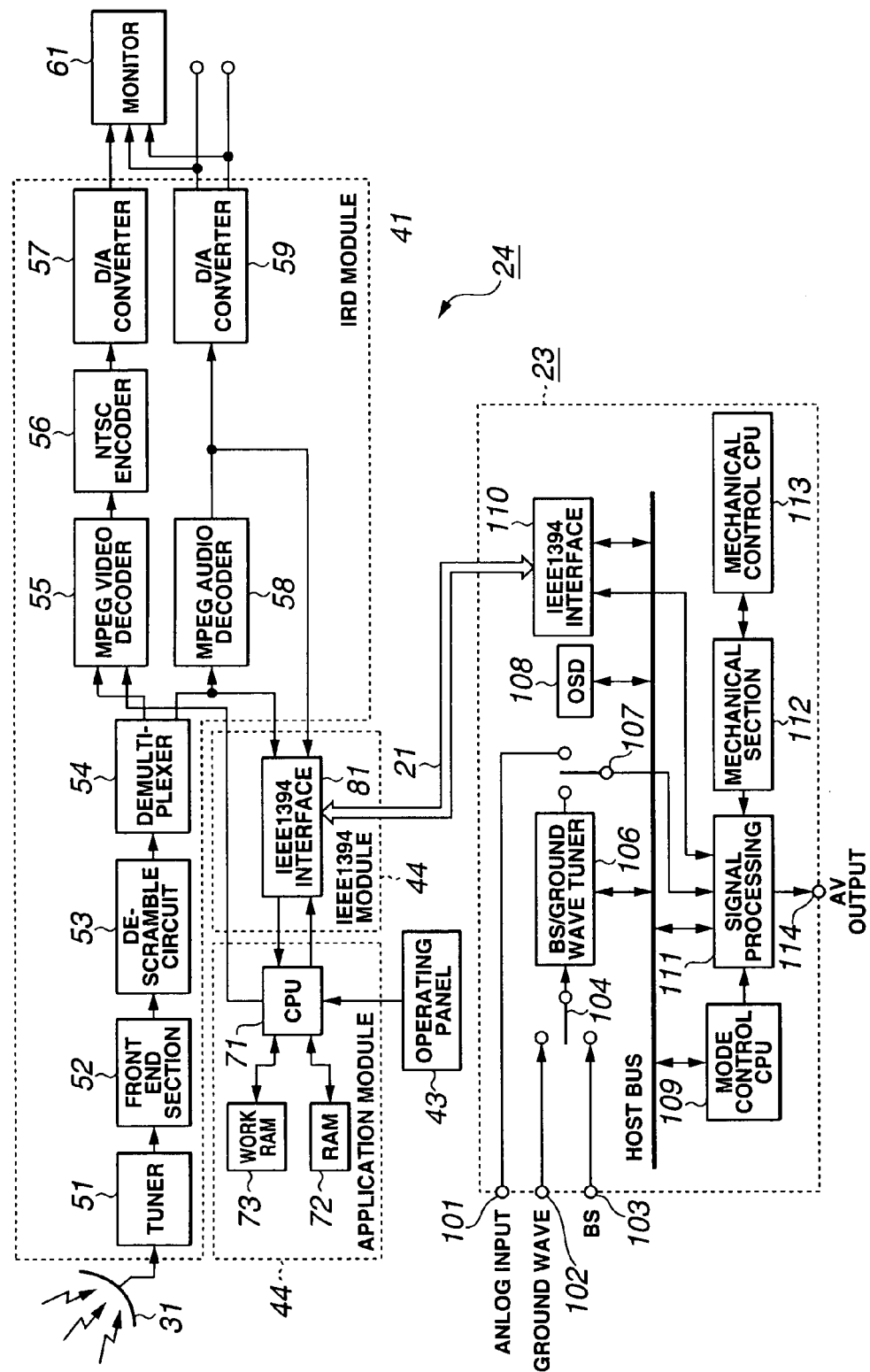
FIG. 2 is a view showing the constitution of a set top box and a digital VTR in FIG. 1.

FIG. 2 shows a further detailed constitutional example of the set top box 24 and the digital VTR 23. The IRD module 41 of the set top box 24 receives a signal from a fixed transponder of a satellite out of signals supplied to a tuner 51 from the antenna 31 in response to a command from a CPU (Central Processing Unit) 71 and outputs it to a front end part 52. The front end part 52 decodes the signal input from the tuner 51 to output it to a descramble circuit 53.

The descramble circuit 53 descrambles data supplied from the front end part 52 on the basis of code key information of a contract channel stored in an IC card (not shown) mounted on the IRD module 41, and outputs it to a demultiplexer 54. The demultiplexer 54 rearranges data supplied from the descramble circuit 53 every channel, removes a component of the channel corresponding to a command from CPU 71 (a command from a user), outputs a video stream comprising a video packet to a MPEG (Moving Picture Experts Group) video decoder 55, and outputs an audio stream comprising an audio packet to a MPEG audio decoder 58.

The MPEG video decoder 55 decodes the video stream input and outputs it to a NTSC encoder 56. The NTSC encoder 56 converts video data input from the MPEG video decoder 55 into video data of the NTSC system, further D/A converts it into a D/A converter circuit 57, and outputs it to a monitor 61.

The MPEG audio decoder 58 decodes the audio stream supplied from the demultiplexer 54 in the MPEG system, restores PCM (Pulse Code Modulation) audio data before being compressed and coded, and outputs it to a D/A converter circuit 59. The D/A converter circuit 59 converts the PCM audio data into an analog audio signal of a left channel and an analog audio signal of a right channel to supply them to a loudspeaker (not shown) of the monitor 61.

The output of the MPEG audio decoder 58 is input into an IEEE1394 interface 81 of the IEEE1394 module 44, and enables outputting it to the IEEE1394 from the IEEE1394 interface 81, if necessary.

In this embodiment, the application module 42 is composed of a CPU for controlling parts of the set top box 24, a RAM (Random Access Memory) 72, and a work RAM 73.

In the RAM 72, programs processed by the CPU 71 are suitably developed. In the work RAM 73 are suitably stored data required in executing various processes by the CPU 71.

In this embodiment, the IEEE1394 is composed of an IEEE1394 interface 81.

On the other hand, in the digital VTR 23, a mechanical section 112 is provided with a mechanism for recording and reproducing a digital audio signal and a digital video signal, operation of which is controlled by a mechanical control CPU 113.

The digital audio signal and the digital video signal reproduced from a video tape in the mechanical section 112 are sent to a signal processing circuit 111.

Further, in the digital VTR 23, an analog video signal, a ground wave television signal, and for example a BS (satellite broadcast) signal can be input into a terminal 101, a terminal 102, and a terminal 103, respectively. The ground wave television signal and the BS signal are suitably selected by a changeover switch 104 and received by a BS/ground wave tuner 106. A BS signal or a ground wave television signal output from the BS/ground wave tuner 106 and an analog video signal are sent to the signal processing circuit 111 suitably selected by a changeover switch 107.

The signal processing circuit 111 applies signal processing corresponding to a signal selected out of the analog vide signal, BS signal and ground wave television signal, or a digital audio signal and a digital video signal reproduced from a video tape by the mechanical section 112, and a digital audio signal and a digital video signal supplied through the IEEE1394 if necessary to produce an audio signal and a video signal to be output to a television set. Where the digital VTR 23 is a VTR provided with a function corresponding to the MPEG encode and decode processing, the signal processing circuit 111 also takes charge of the MPEG encode and decode processing. The audio signal and the video signal produced by the signal processing circuit 111 is sent to a television set connected to a terminal 114.

A mode control CPU 109 of the digital VTR 23 control parts of the digital VTR 23. The mode control CPU 109 executes various processes on the basis of data and programs suitably stored in RAM.

An IEEE1394 interface 110 executes interface processing with respect to the IEEE1394 bus 21. The IEEE1394 interface 110 delivers control data supplied, for example, from the set top box 24 and the LAV controller 22 to the mode control CPU 109 through the IEEE1394 bus 21. The IEEE1394 interface 110 outputs a digital audio signal and a digital video signal supplied, for example, from the set top box 24 to the signal processing circuit 111 through the IEEE1394 bus 21.

It is noted that both the set top box 24 as a controller and the LAV controller 22 which is LAV are possible to control the digital VTR 23 which is LAV. Accordingly, where the set top box 24 and the LAV controller 22 simultaneously control the digital VTR 23 as a target, there possibly occurs inconvenience that the digital VTR 23 is simultaneously controlled by the set top box 24 and the LAV controller 22.

In view of the above, in the present embodiment, by the provision of the control object device monitoring function section 40 in the set top box 24 corresponding to FAV and IAV mentioned in HAVi, it is possible to avoid the occurrence of simultaneous control with respect to LAV as mentioned above.

That is, in the present embodiment, the control object device monitoring function section 40 of the set top box 24 inquires about statuses of devices connected to the IEEE1394 bus 21 to thereby monitor whether the present status of a device (a control object device) intended to be controlled as a target by the set top box 24 is the status placed under the control (under the operation) of other equipment, result of which is fed back to the HAVi module group 45, and further, the HAVi module group 45 displays, upon receipt of the monitoring result, to give a user on the set top box 24 side a warning, for example, thereby enabling avoidance of occurrence of the above-described inconvenient in advance.

Now, the control object device monitoring function section 40 performs, as an example of a concrete procedure for realizing the control object device monitoring function, detection if, by polling the status of a target, the target is controlled by the other equipment at present. The control object device monitoring function section 40 in the present embodiment also performs judgment, prior to the above-described detection, if the possessory rights of equipment caused by a reserve command out of AV/C commands in the IEEE1394 are already set to the target. If the possessory rights caused by the AV/C reserve command is not set, the above-described detection is carried out. In the case of the present embodiment, where whether or not the control object device caused by the reserve command is reserved is unclear, monitoring of the using circumstances of the control object device becomes more positive by using the above-described detecting means, but the monitoring of the using circumstances of the control object device is enabled even merely by the above-described detecting means. The reserve command in the AV/C command will be described in detail later.

Figure 3:
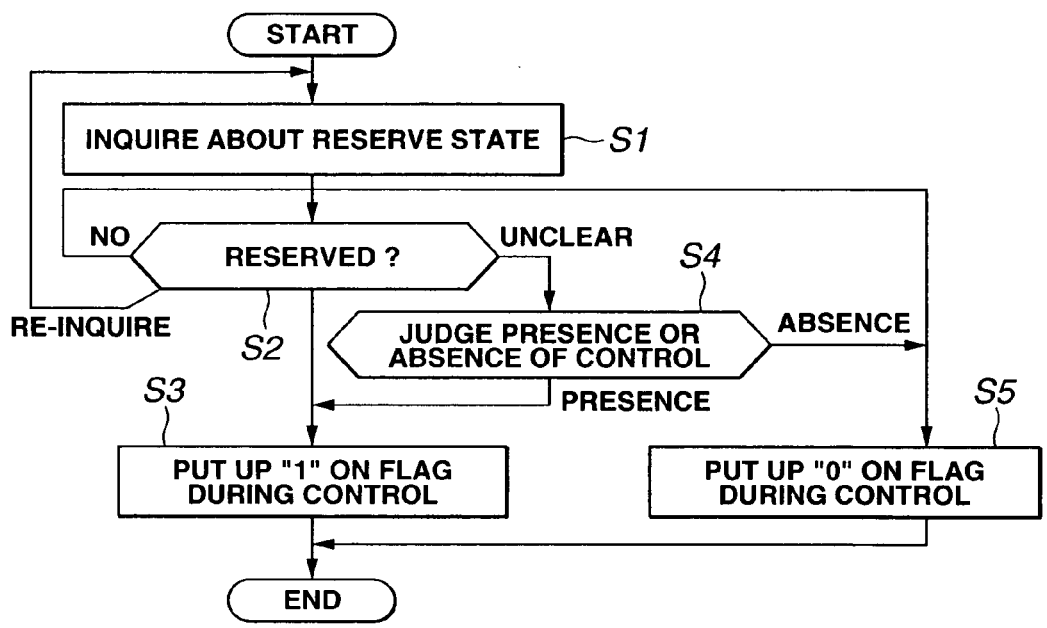
FIG. 3 is a flow chart used in explanation of a flow of the whole control object device monitoring operation in a control object device monitoring function section.

FIG. 3 shows a flow of the whole equipment monitoring operation in the control object device monitoring function section 40. It is noted that in the control object device monitoring operation described below, the set top box 24 may perform with respect to all the equipment on the network or merely with respect to the specific control object device.

In FIG. 3, the control object device monitoring function section 40 inquires, first, as the processing of Step S1, of the individual control object devices connected to the IEEE1394 bus 21 about the possessory state by the reserve status command, and then, judges, as the processing of Step 2, if being occupied, or not occupied, or unclear, or making re-inquiry, depending on the contents of the response from the individual control object devices. Where the response is stable, and the return value within the response packet is one other than "0" which is a value defined in the AV/C command, judgment is made to be occupied. On the other hand, where the response is stable, and the return value within the response packet is "0" which is a value defined in the AV/C command, judgment is made not to be occupied. On the other hand, where the response is "not implement" and "rejected", and where the response is not returned and the fixed response-waiting time has passed, judgment is made to be unclear. Where the response is in transition, an inquiry is made again by the reserve status command.

In the Step S2, where the control object device having been judged to be reserved is present, that is, where the control object device is present which is judged that the response to the issue of the reserve status command is stable, the return value within the response packet is a value other than "0" and the possessory rights of equipment is already set, the control object device monitoring function section 40 puts up, as the processing of Step S3, "1" on a flag showing that the control object device is already controlled by other equipment (called a flag during control in the present embodiment).

On the other hand, where in the Step S2, in the case of the control object device having been judged not to be reserved by the reserve status command, that is, in the case of the judgment in which the return value within the response packet with respect to the reserve status command is "0" and the possessory rights of equipment is not set, the control object device monitoring function section 40 proceeds to the processing of Step S5, and puts up a flag during control showing that the control object device is not controlled.

Further, in Step S2, where the control object device is present which cannot be judged, depending on the reserve status command, whether or not the reservation is made, that is, where the response is "not implemented" and "rejected", or where the response is not returned to make judgment that the fixed waiting time has passed and being unclear, the control object device monitoring function section 40 proceeds to the processing of Step S4. Where the response is "in transition", the procedure proceeds to Step 1 in order to make reinquiry by the reserve status command.

In the processing of Step S4, the control object device monitoring function section 40 judges, by the detection, whether or not the control object device is controlled by other equipment. That is, in this case, the control object device monitoring function section 40 tries to make polling the status of the control object device thereby making detection whether or not the device is controlled by other equipment. The detailed flow of the Step 4 will be described later. In the Step S4, where judgment is made such that the device is controlled by other equipment (where detection is made that control is present), the control object device monitoring function section 40 puts up, as the processing of Step S3, "1" on a flag during control showing that the control object device is already controlled by other equipment.

On the other hand, in the Step S4, where judgment is made such that the device is not controlled by other equipment (where detection is made that control is absent), the control object device monitoring function section 40 puts up, as the processing of Step S5, "0" on a flag during control showing that the control object device is not controlled by other equipment.

Figure 4:
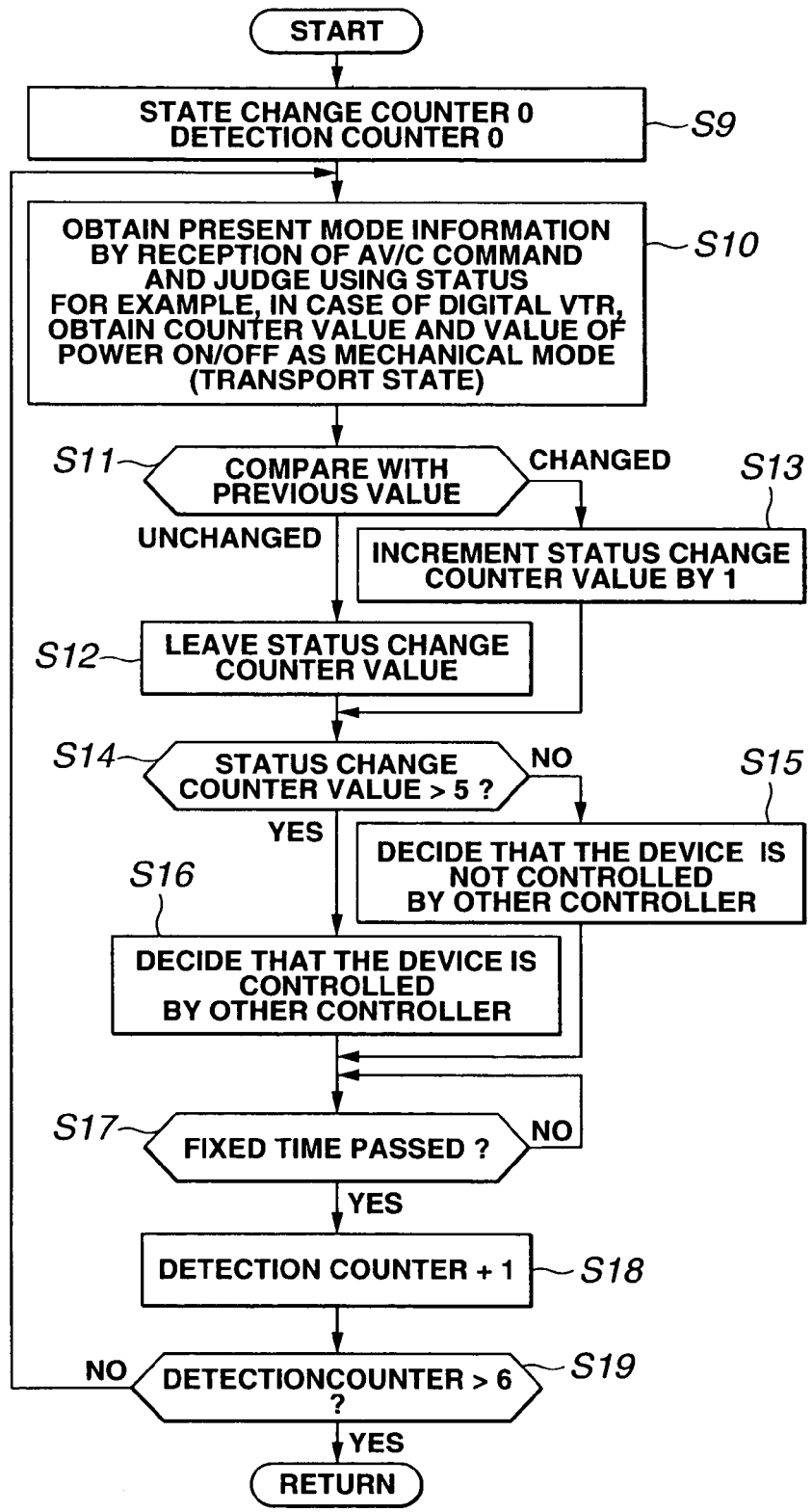
FIG. 4 is a flow chart used in explanation of a detailed flow of Step 4 in the flow chart of FIG. 3.

Next, FIG. 4 shows a detailed flow of the processing of Step 4 in FIG. 3.

First, the control object device monitoring function section 40 clears (initializes), as Step 9 of FIG. 4, both values of a status change counter for counting the status change of the control object device and a detection counter for counting the number of times of monitoring operation to "0". The status change of the control object device is different depending on to which the control object device belongs. For example, where the control object device is a disc device, the status change is a change of control status value of the disc device, where the control object device is a tape device, the status change is a change of control status value of the tape device, and where the control object device is a semiconductor device, the status change is a change of control status value of the semiconductor device. As more concrete examples of the status changes of the control object device, there can be listed, for example, such as a change of a recording passage time counter in a recording and reproducing device, a change of a reproducing passage time counter, a change of a frame value, a change of a field value, a change of a track number, a change of a tape counter value in case of a tape device, and an office number in case of a tuner.

Next, with respect to the control object device judged to be unclear in Step S2 in FIG. 3, the control object device monitoring function section 40 obtains, as the processing of Step 10 in FIG. 4, the present mode information of the control object device by reception of AV/C commands to judge the using circumstances. Mode information here include, where the control object device is a digital VTR, a value of a tape counter in a mechanical mode (mechanical states (such as play, and stop)), and a value of power ON/OFF. The control object device monitoring function section 40 obtains these values. After the processing of Step S10, The control object device monitoring function section 40 proceeds to the processing of Step S11.

When proceeding to Step S11, the control object device monitoring function section 40 compares the thus obtained mode information with the previous value already obtained. In the present embodiment, as the mode information, for example, a tape counter value of a digital VTR is obtained for comparison. Where the mode information is obtained for the first time, the processing of the Step S11 is passed. In the Step S11 processing, where as the result of comparison between the previous mode information and the mode information obtained this time, judgment is made that the value changed, the procedure proceeds to the processing of Step S13, and where judgment is made that there is no change, the procedure proceeds to the processing of Step S12.

The control object device monitoring function section 40 proceeds, when proceeded to the processing of Step S13, to the processing of Step S14 after the internal status change counter value has been incremented by 1, and when proceeded to the processing of Step S12, proceeds to the processing of Step S14 leaving the internal status change counter value. The status change counter is prepared for all the control object devices judged to be unclear in Step S2 of FIG. 3.

When proceeds to the processing of Step S14, the control object device monitoring function section 40 judges whether or not the status change counter value is larger than a fixed value (for example, 5); where judgment is made to be larger than the fixed value, the procedure proceeds to Step S16, and where judgment is made to be smaller than the fixed value, the procedure proceeds to Step S15.

When proceeds to Step S16 upon judgment that the status change counter value is larger than the fixed value in the processing of Step S14, the control object device monitoring function section 40 decides that the control object device corresponding to the status change counter value is controlled by other equipment (for example, the LAV controller 22 in FIG. 1).

On the other hand, when proceeds to Step S16 upon judgment that the status change counter value is smaller than the fixed value in the processing of Step S14, the control object device monitoring function section 40 decides that the control object device corresponding to the status change counter value is not controlled by other equipment (for example, the LAV controller 22 in FIG. 1).

By the judgment of these Steps S16 and S15, the control object device monitoring function section 40 obtains the result of judgment as to the presence or absence of control in the processing of Step S4 in FIG. 3. That is, where in Step S16, decision is made that the control object device is controlled by the other controller, the result of judgment (predicted result) that the control is present is obtained in Step S4 in FIG. 3, whereby in Step S3 of FIG. 3, "1" is put up on a flag during control. On the other hand, where in Step S15, decision is made that the control object device is not controlled by the other controller, the result of judgment (detected result) that the control is absent is obtained in Step S4 in FIG. 3, whereby in Step S5 of FIG. 3, "0" is put up on a flag during control.

After the processing of the Steps S15 and S16, the control object device monitoring function section 40 judges, as the processing of Step S17, whether or not a fixed time set to be longer time than the time intervals where the status change of the control object device occurs has passed. For example, the time twice of the time required for incrementing a tape counter by 1 is set. After the passage of the fixed time in Step S17, the control object device monitoring function section 40 judges, as the processing of Step S18, a value of the detection counter is increased (increment) by 1 (+1). Then, the control object device monitoring function section 40 judges, as the processing of Step S19, whether the detection processing whether or not the state changed is repeated, or is returned to the original processing. That is, the control object device monitoring function section 40 returns, as the processing of Step S19, to the processing of Step S10 if the value of the detection counter is, for example, smaller than 6, returns to the original processing if the value of the detection counter is larger than 6, and performs the branch processing to Step S3 an Step S5 in FIG. 3 according to the detected results obtained in Step S15 and Step S16 (whether or not the control object device is controlled by other control equipment).

While the aforementioned FIG. 4 flow chart has been described taking up the digital VTR as the control object device, as an example, it is noted that the present invention can be also applied to other equipment not limiting to the digital VTR. In the following, a disc drive (such as a disc recorder and a disc player), VTR, other various players, a tuner, and an amplifier are taken up as examples of the control object devices, and in the case of these control object devices, a concrete example of the processing carried out in Step S10 in a flow chart of FIG. 4 is shown in FIG. 5.

Figure 5:
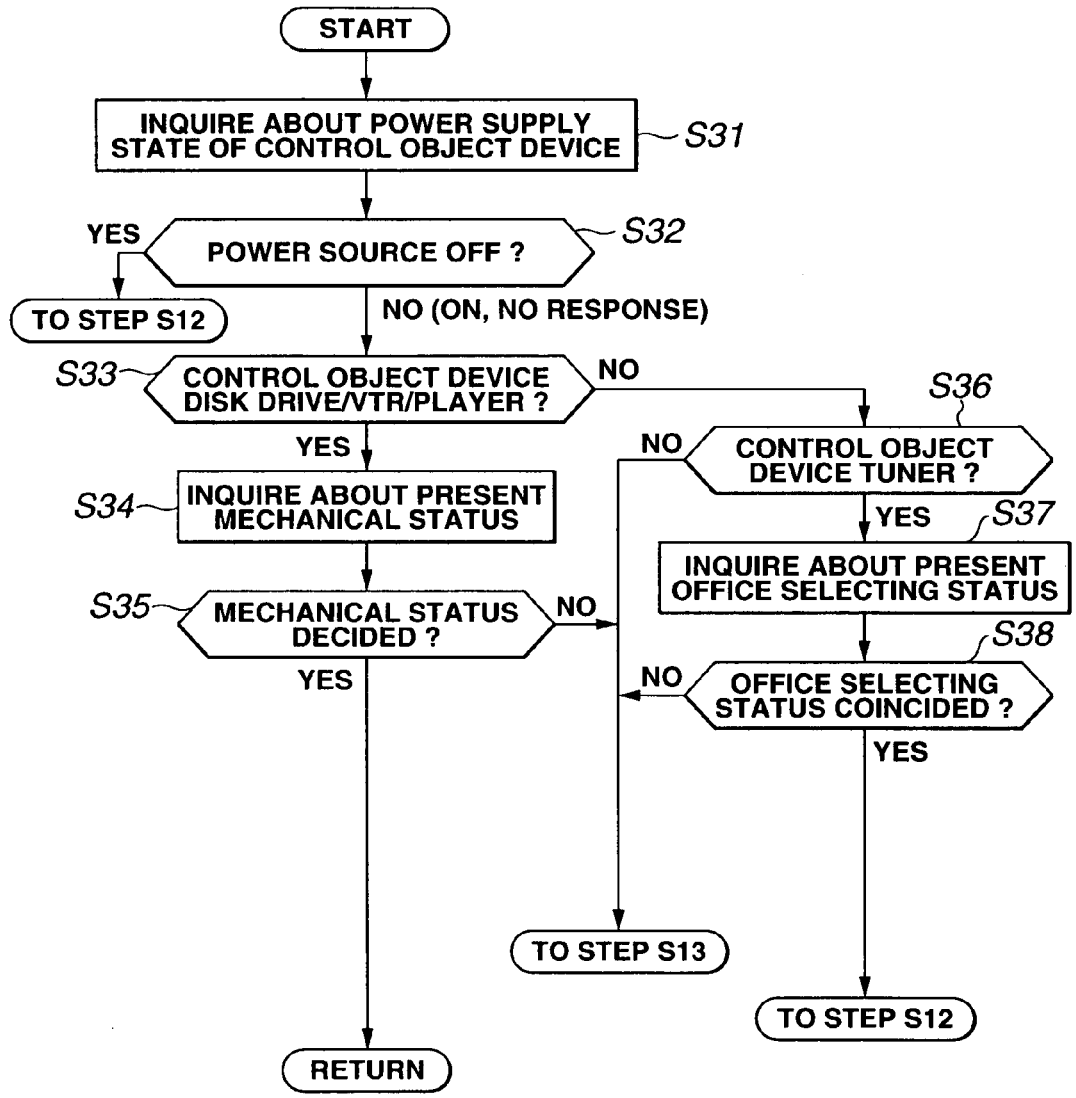
FIG. 5 is a flow chart used in explanation of a concrete flow of Step 10 in the flow chart of FIG. 4.

In FIG. 5, the control object device monitoring function section 40 first inquires, as the processing of Step S31, about the power supply state of the control object device, and then judges, as the processing of Step S32, whether the power supply of the control object device is ON or OFF. Where judgment is made in Step S32 that the power supply of the control object device is OFF, the processing of the control object device monitoring function section 40 directly proceeds to Step S12 (not shown in FIG. 4), whereas where judgment is made that the device is ON, proceeds to the processing of Step 33.

When proceeds to the processing of Step S33, the control object device monitoring function section 40 judges whether the control object device is, equipment having recording function and/or reproducing function, for example, such as a disc drive, VTR, and a player or equipment other than the former, and where judgement is made that it is equipment having recording function and or reproducing function, the procedure proceeds to the processing of Step S34, otherwise the procedure proceeds to Step S36.

When proceeds to the processing of Step S34, the control object device monitoring function section 40 inquires about the present mechanical state of the control object device of the equipment having recording function and or reproducing function, and then judges, as the processing of Step S35, whether or not the mechanical state is decided.

As the processing of judgment whether or not the mechanical state in Step S35 is decided, the control object device monitoring function section 40 judges that the mechanical state of the equipment is decided or unclear according to the contents of the response from the control object device, for example.

That is, the control object device monitoring function section 40 first transmits a status command which is one of AV/C commands for inquiring about the mechanical state of the equipment to equipment (for example, VTR) having recording function and/or reproducing function. When the response to this inquiry is stable, the control object device monitoring function section 40 judges that the mechanical state is decided. Where the response is not obtained and the response waiting time has passed, it judges to be unclear.

On the other hand, where the state is "In Transition", other responses are received, or "Not Implemented" or "Rejected" is returned, and the response is not obtained and the response waiting time has passed, the control object device monitoring function section 40 judges to be unclear.

Where in Step S35, judgment is made that the mechanical state is decided, the processing of the control object device monitoring function section 40 proceeds to Step S11 of FIG. 4. On the other hand, Where in Step S35, judgment is made that the mechanical state is not decided, the processing of the control object device monitoring function section 40 directly proceeds to Step S13 of FIG. 4 (not shown in FIG. 4).

With respect to the above-described "Stable", "In Transition", "Not Implemented", and "Rejected", there is described in detail in Reference 1, "AV/C Digital Interface Command Set General Specification Version 3.0 (issued by 1394TA AVWG), page 17 (7.3 Status commands), description of which is therefore omitted.

When in the Step S33, judgment is made of equipment other than equipment having recording function and/or reproducing function, and the procedure proceeds to the processing of Step S36, the control object device monitoring function section 40 judges whether or not the control object device is, for example, a tuner. Where judgment is made in Step S36 that the control object device is not a tuner (for example, an amplifier is included here), the processing of the control object device monitoring function section 40 proceeds to Step S13 of FIG. 4, and where judgment is made that the device is not a tuner, the procedure proceeds to the processing of Step S37.

When the procedure proceeds to the processing of Step S37, the control object device monitoring function section 40 inquires of the control object device (tuner) about the present office selecting state, and judges, as the processing of Step S38, whether or not the state of the office selection is coincided.

For judging whether or not the state of the office selection is coincided, the control object device monitoring function section 40 first obtains the access right to a tuner subunit status descriptor as data base having the state of the tuner described therein by an open descriptor control command which is one of AV/C commands. Next, the control object device monitoring function section 40 reads out a source plug status area having office selecting information described therein by a read descriptor control command which is one of AV/C commands.

The control object device monitoring function section 40 judges the state of the office selection by the response of the inquiring commands.

That is, for example, when the response of a command for obtaining the access right of data base in which the first tuner state is described is "Accepted", the control object device monitoring function section 40 obtains the access right of the data base, and the procedure proceeds to next command processing.

On the other hand, when the response is "Rejected" or "Not Implemented", the control object device monitoring function section 40 cannot obtain the access right and judges that the office selecting state is unclear. Then, the procedure proceeds directly to Step S13 (not shown in FIG. 4).

Further, when the response is "Interim", the control object device monitoring function section 40 awaits till the response is returned. However, where the response is not returned and the response waiting time has passed, judgment is made of unclear, and the procedure proceeds directly to Step S13 (not shown in FIG. 4).

Next, when the response of a command for reading out a source plug status in which office selecting information is present is "Accepted", the control object device monitoring function section 40 can obtain office selecting information, and evaluates the data status and the information type status of a source plug status area in which the read-out office selecting information is present to decide the office selecting state.

Judgment is made whether or not the office being already used by the control object device is coincided with the office desired to be used by the control equipment. In the case of the same, judgment is made to be controllable, and the procedure proceeds directly to Step S12 (not shown in FIG. 4). On the other hand, in the case of difference, the control is regarded to be impossible, and the procedure proceeds directly to Step S13 (not shown in FIG. 4).

The above-described open descriptor control command is described in detail in Reference 1, page 49, "10.1 OPEN DESCRIPTOR Command", details of which are omitted. The above-described read descriptor control command is described in detail in Reference 1, page 55, "10.2 READ DESCRIPTOR Command". The-above described tuner sub-unit status descriptor is described in detail in Reference 1, page 26 "4.3 Tuner subunit descriptor", and page 28, "source plug status [x] fields". The "Accepted", "Interim", "Not Implement", and "Rejected" are described in detail in Reference 1, "AV/CDigital Interface Command Set General Specification Version 3.0 issued by 1394TA AVWG, page 16 (7.2 Control commands).

Figure 6:
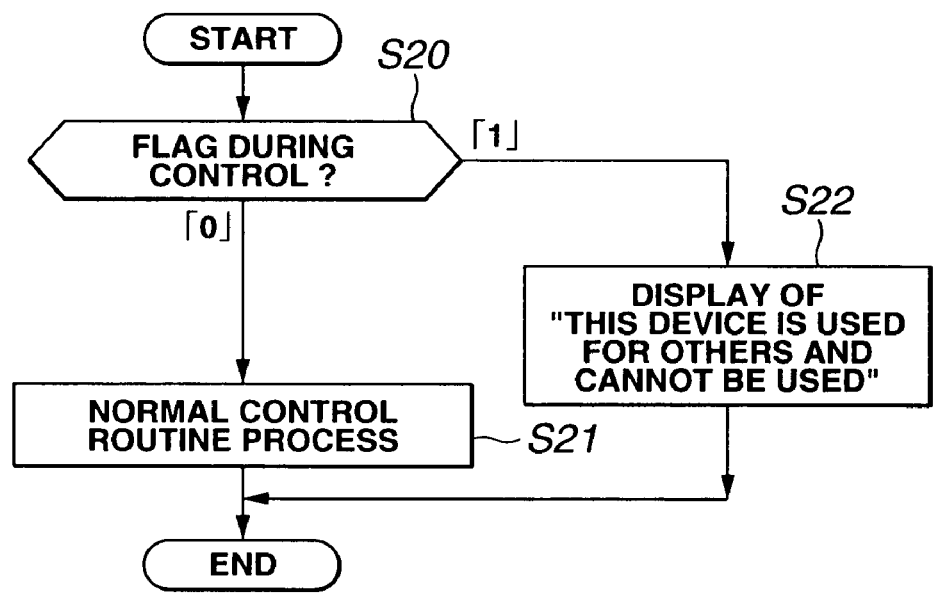
FIG. 6 is a flow chart used in explanation of a concrete flow of operation of a target control according to a HAVi module group based on a report from the control object device monitoring function section.

Next, FIG. 6 shows a flow of the processing where a set top box 24 (a HAVi module group 40, particularly an application module 42) provided with the control object device monitoring function section 40 control the desired control object device as a target.

In FIG. 6, the HAVi module group 40 of the set top box 24 judges, as the result of a report as to the occupation of each control object device obtained by the monitoring of the individual object devices conducted by the control object device monitoring function section 40 as mentioned above, that is, using the flag during control, as the processing of Step S20, whether the flag during control of the control object device as a target is "1" or "0".

Where in Step S20, judgement is made that the flag during control of the control object device as a target is "0", the HVI module group 40 controls the control object device according to the normal control routine since the control object device is not controlled by other equipment (for example, the LAV controller 22 in FIG. 1).

On the other hand, where in Step S20, judgement is made that the flag during control of the control object device as a target is "1", the HVI module group 40 produces a warning indicating signal, for example, "This device is used for others and cannot be used." to output it to a monitor 61 or the like, since the control object device is controlled by other equipment (for example, the LAV controller 22 in FIG. 1) and cannot be controlled. Thereby, the user of the set top box 24 is possible to know that the device cannot be controlled.

As described above, according to the present embodiment, it is possible that one equipment cannot be operated simultaneously by a plurality of controllers.

While in the example of FIG. 1 described above, the control object device monitoring function is provided within the device (set top box 24) in conformity to the HAVi, and the control object device monitoring function section 40 is prepared separately from the HAVi module group 45 so that the report of the monitored result by the control object device monitoring function section 40 is notified to the HAVi module group 45, it is noted that the control object device monitoring function can be also included in DCM as one function of the HAVi.

Figure 25:
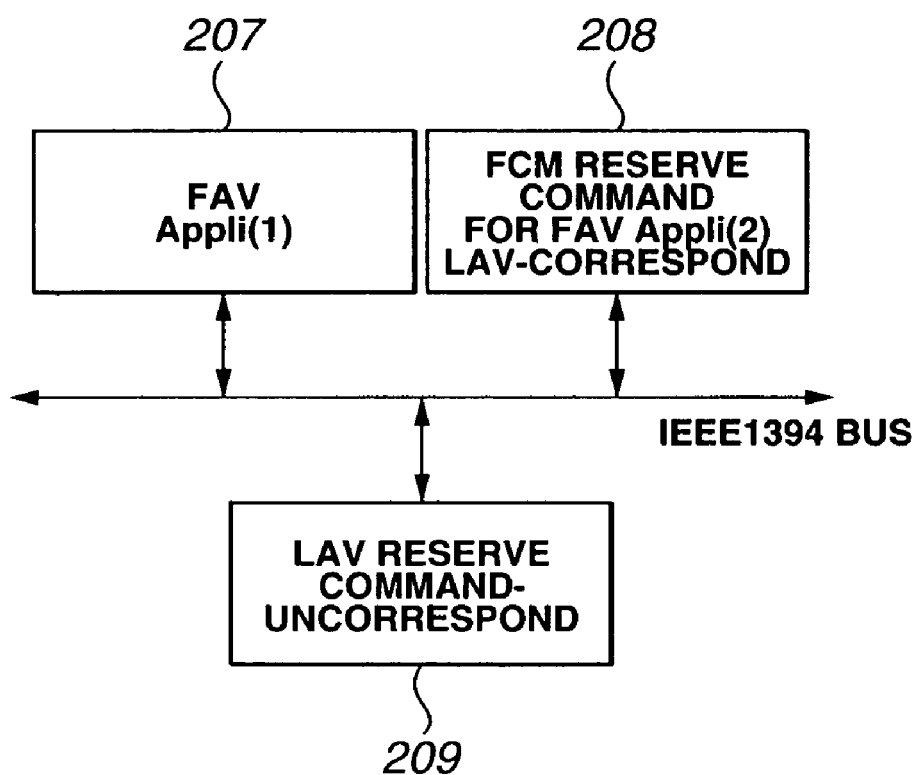
FIG. 25 is a view used in explanation of problems where a controller which FAV having FCM for LAV corresponding to a reserve command and a controller which is FAV control a target which is LAV not corresponding to a reserve command.
Figure 26:
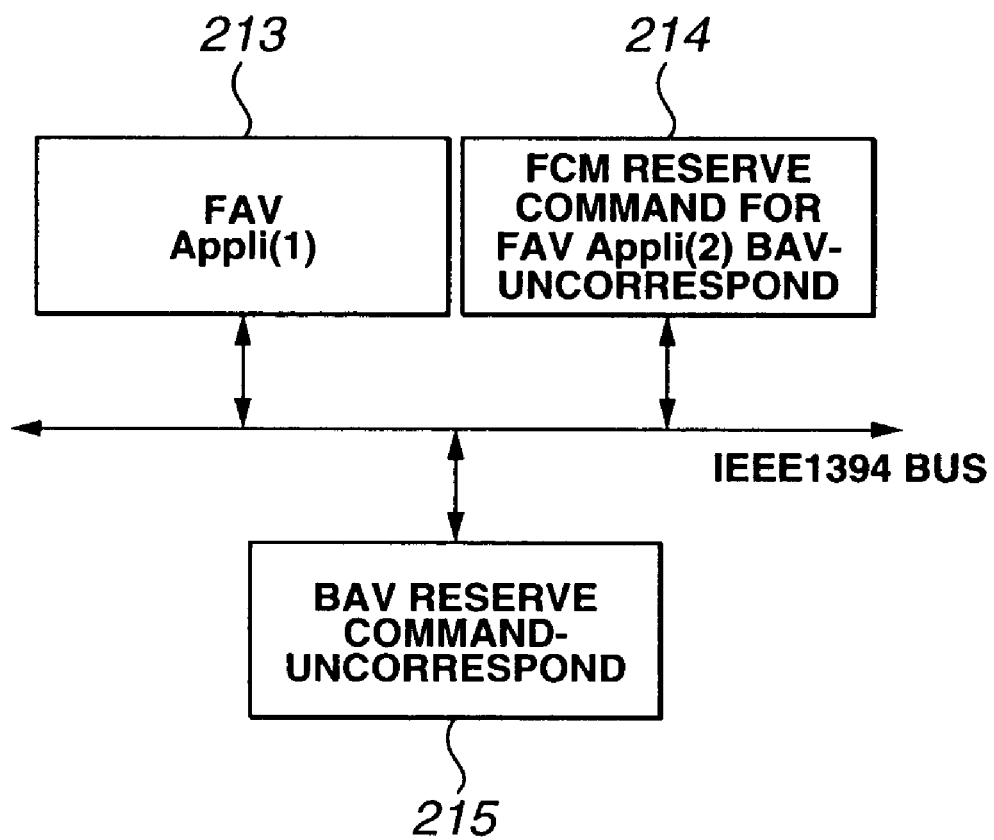
FIG. 26 is a view used in explanation of problems where a controller (214) of FAV uploads DCM not corresponding to a reserve command from BAV, and a controller (214) of FAV controls a target (215) of BAV to an interface.
Figure 27:
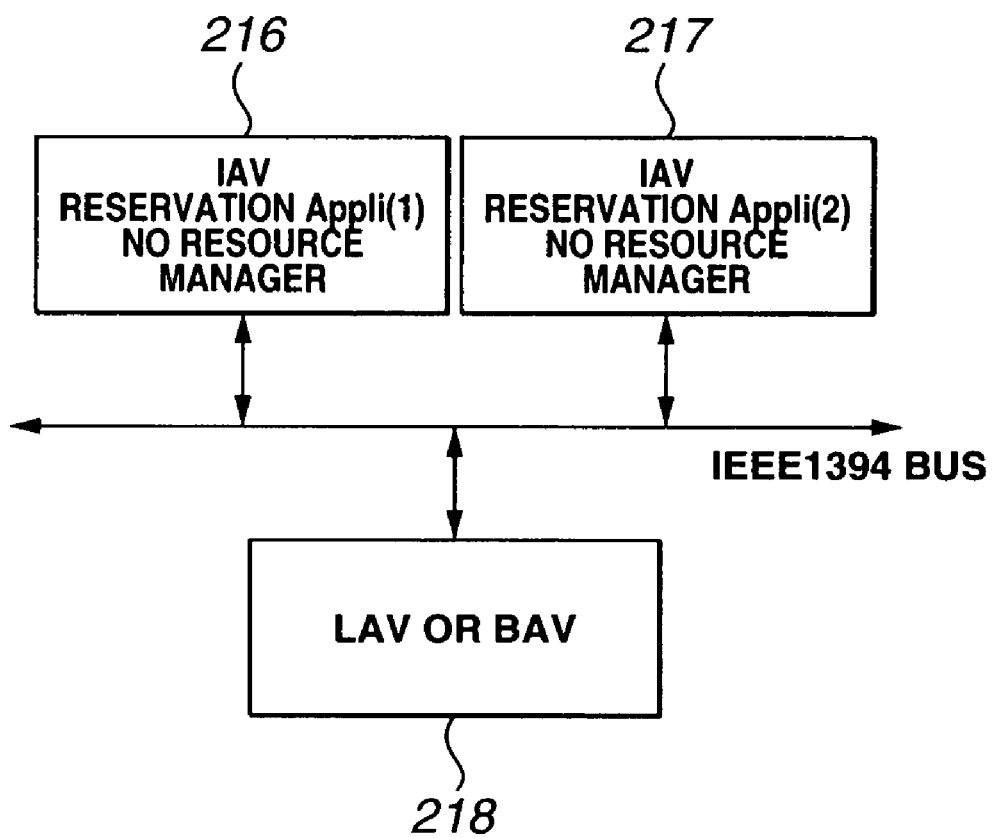
FIG. 27 is a view used in explanation of problems where two controllers which are IAV without resource manager control a target which is LAV or BAV BAV having own DCM and FCM)

Further, according to the present embodiment, in the control object device monitoring function, the monitoring operation as described above is carried out whereby for example, even in the constitution as shown in FIGS. 25, 26 and 27, confliction can be avoided.

Furthermore, also, for example, in the network constituted merely by equipment corresponding to only the conventional AV/C command, if means for monitoring devices (control object device monitoring function section) within the network is provided, the monitoring operation similar to that mentioned above can be similarly realized.

A series of processings as described above can be executed by the hardware, but can be also executed by the software. Where the series of processings are executed by the software, a computer in which a program constituting the software is incorporated into the set top box 24 as an exclusive-use hardware, or various programs are installed, whereby they can be installed in, for example, a general-use personal computer capable of executing various functions.

A reserve command of AV/C commands will be described hereinafter.

The reserve command and the response corresponding thereto are provided as one kind of the AV/C command and the response. The AV/C command and the response are transmitted by FCP (Function Control Protocol provided by IEC-1883. FCP is provided to capsule a command for controlling equipment and a response within asynchronous block write transactions of IEEE standard 1394-1995, format of which is constitute as shown in FIG. 7.

Figure 7:
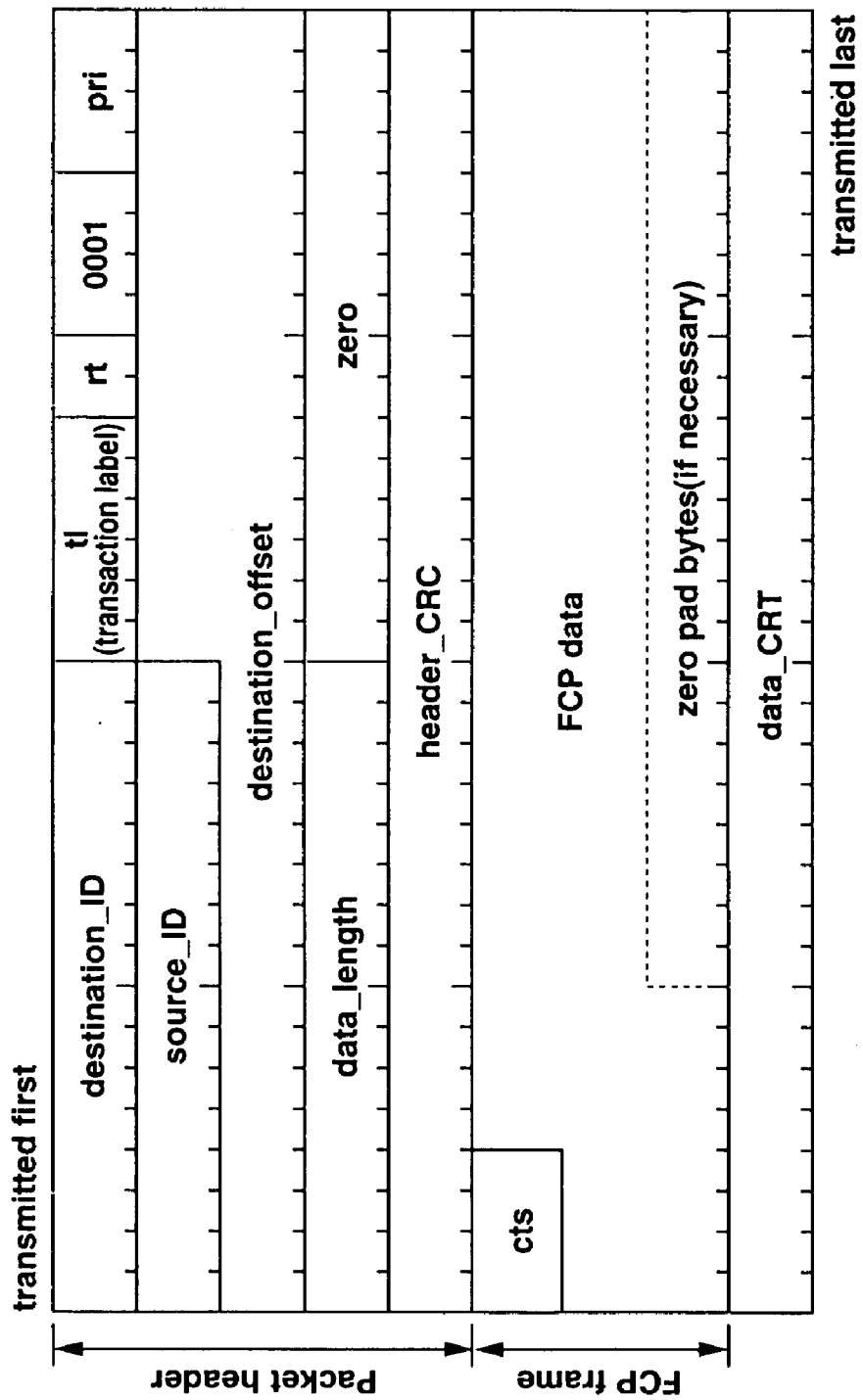
FIG. 7 is a view used in explanation of a format of a FCP frame

As shown in FIG. 7, at the head is arranged a packet header, a FCR frame is then arranged, and finally, data CRC is arranged.

At the head of the packet header is arranged destination ID. The destination ID represents ID of a node to which the packet is transferred. In the figure, t1 indicates a transaction label, representing a unique tag added to the packet from the node. In the figure, rt indicates a retry code, representing a code relating to retry.

In FIG. 7, tcode represents a transaction code, value of which is 0001 in this example. This 0001 represents that this block is a write-in request for the data block.

In FIG. 7, pri represents a priority, by which value, arbitration in a link layer is carried out.

Source ID represents ID of a node for delivering the packet. A destination offset represents an address of a register in which a command or a response of the packet is written.

Figure 8:
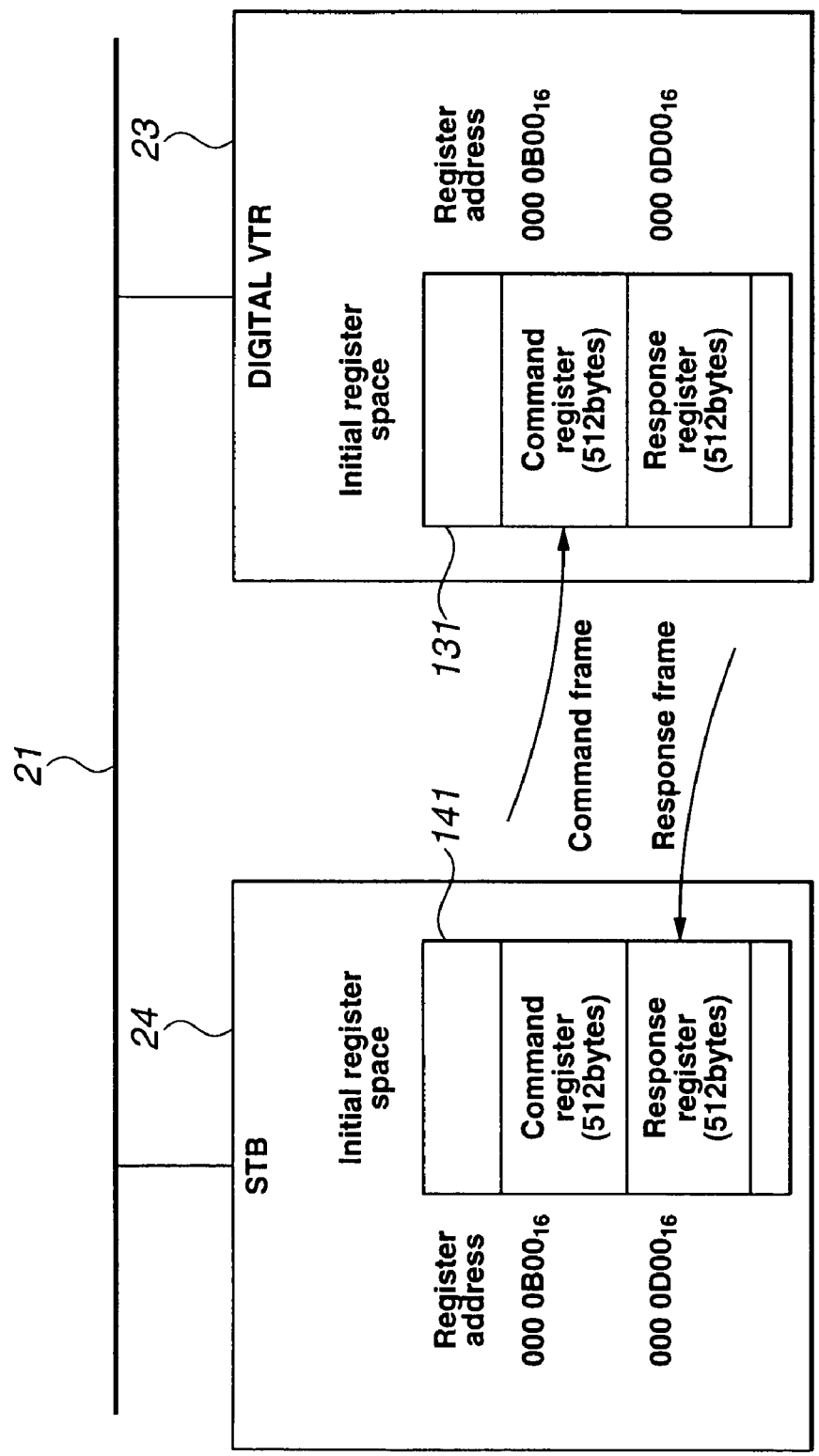
FIG. 8 is a view used in explanation of a command register and a response register.

That is, for example, as shown in FIG. 8, the set top box 24 connected to an IEEE1394 bus has a register 1.41 within an IEEE1394, and a digital VTR23 has a register 131 within an IEEE1394 interface 110. For example, the digital VTR 23 allows a command and a response transferred through the IEEE1394 bus 21 from the other node to hold in an address of the register 131 provided by the destination offset. Similarly, the set top box 24 also allows a command and a response transferred from the other node to store in an address provided by the destination offset of the register 141. The set top box 24 and the digital VTR 23 read out the command or response stored in these registers 141 and 131.

In FIG. 7, a data length represents a data length in a data field. In the succeeding 2 bytes, a value 0 is described. The final header CRC represents an erroneous detection symbol within the packet header.

Figure 10:
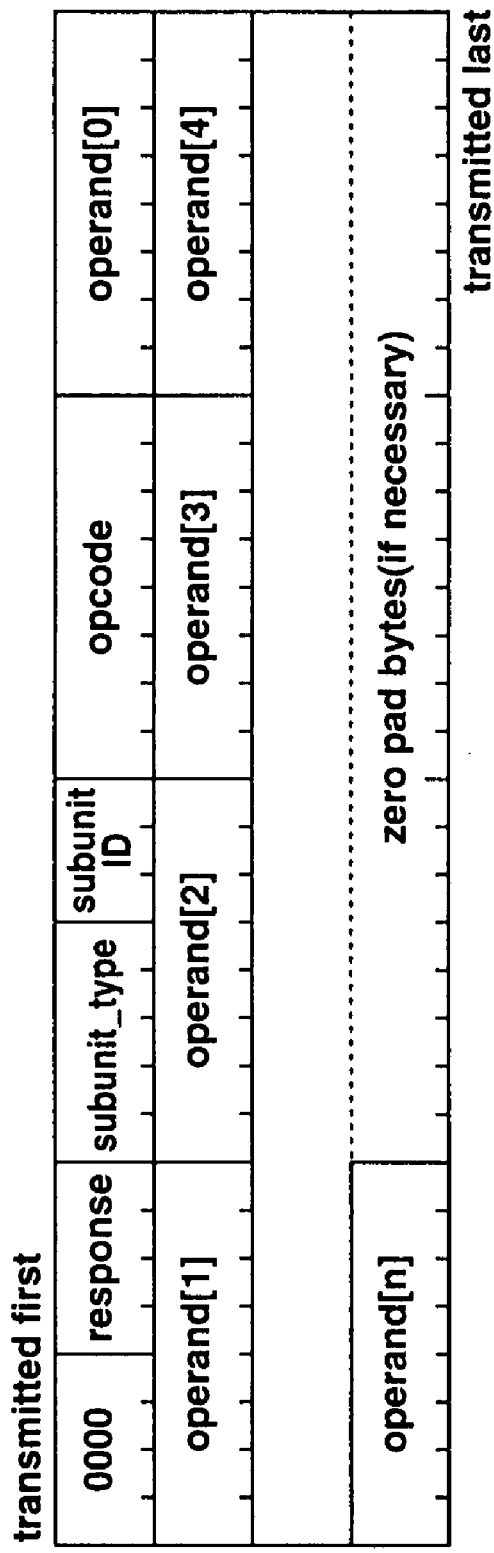
FIG. 10 is a view used in explanation of a format of an AV/C response frame.

In the FCP frame in a pay-load portion is arranged a CTS (Command/Transaction Set) as first 4 bits. In the case of the V/C transaction, the CTS has a value of 0000. Next, FCP data are arranged. The details of th FDP data are shown in FIGS. 9 and 10. FIG. 9 shows a FCP frame of an AV/C command frame, and FIG. 10 shows a FCP frame of an AV/C response frame.

In FIG. 9, ctype indicates a command type, and values provided therein means as shown in FIG., 11. That is, the value 0 means CONTROL, and the value 1 represents STATUS.

A subunit_type represents a kind of subunit which is an object of this command, value 0 thereof means that the kind of subunit is a video monitor, and value 3 represents a disc recorder or player, as shown in FIG. 12.

A subunit ID is used as an instant number in case where an expansion subunit type is defined. Values 0 to 4 represent instant numbers, and a value 5 represents that the subunit ID represents that the subunit ID is expanded to next byte, as shown in FIG. 13.

Figure 14:
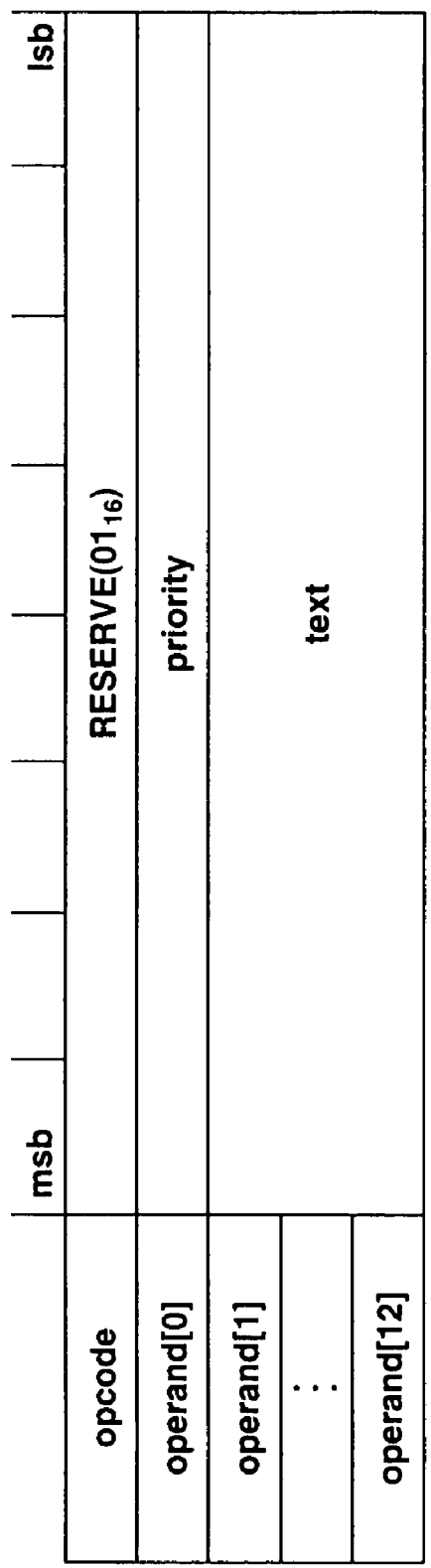
FIG. 14 is a view used in explanation of a format of a reserve control command.

In FIG. 9, opcode represents an operation cord, and in case of reserve, its value is 01, as shown in FIG. 14. Next to the opcode, operand [0] to operand [n], and in case of FIG. 14, n=1 are arranged. A priority is arranged in the operand [0]. This priority provides a relative priority order incidental to a command. The value 9 means that no controller reserves its node. Values I to F mean that a target has reservation for a controller. The value 4 of priority is a standard priority used by a controller.

A target in a free state (not reserved) is reserved by a controller which issues a reserve control command. The target stores a row of texts incidental to the priority reserved, and node ID of 16 bits of a controller. ASCII characters are inserted up to 12 bytes into a text following the priority.

A value held when the value of priority is received by the target is converted as shown in FIG. 15. For example, values 0 and 1 are held as the priority. Values 2 to E (16 antilogarism) are held as priority and value E. Value F is held as priority.

The node (target) rejects, when reservation of a fixed controller is held, a control command other than the command type reserve of a control issued from other controllers.

When a reserve control command is received from one and the same controller holding reservation, it is accepted. This allows an original controller to make priority resulting from the reservation higher or lower.

When a reserve control command is received from a controller other than controllers having made reservation, the target rejects its command as long as the priority is not higher than the priority of the present reservation. When a new priority is higher than the present priority, a new reservation is established.

Where a reserve control command is issued to an AV unit having a subunit holding reservation of equal or higher priority, the reserve control command returns a rejected response.

Where a reserve control command is issued to an AV unit not including a subunit having equal or higher priority, the reservation is established.

Where a control command is issued to a subunit within the AV unit reserved by a controller other than controllers which issued a control command, its control command is rejected.

The AV unit resets, when a bus reset is detected, priority of the reservation to 0, and set all of reservation node ID and reservation text to 1. The AV unit rejects all commands of a command type of a control except the reserve command till the reservation is established or till 10 seconds pass. This procedure allows an original reservation holder to re-establish reservation after the bus reset.

Each controller never issue a reserve control command within 10 seconds from the bus reset except the case where reservation has been established for the target prior to the bus reset. Since the node ID of the AV unit is changed after the bus reset, a controller which desires to establish the reservation examines the node unique ID.

From the these circumstances, the target presumes that a reserve command received within 10 seconds of the bus reset to receive the reservation.

Figure 16:
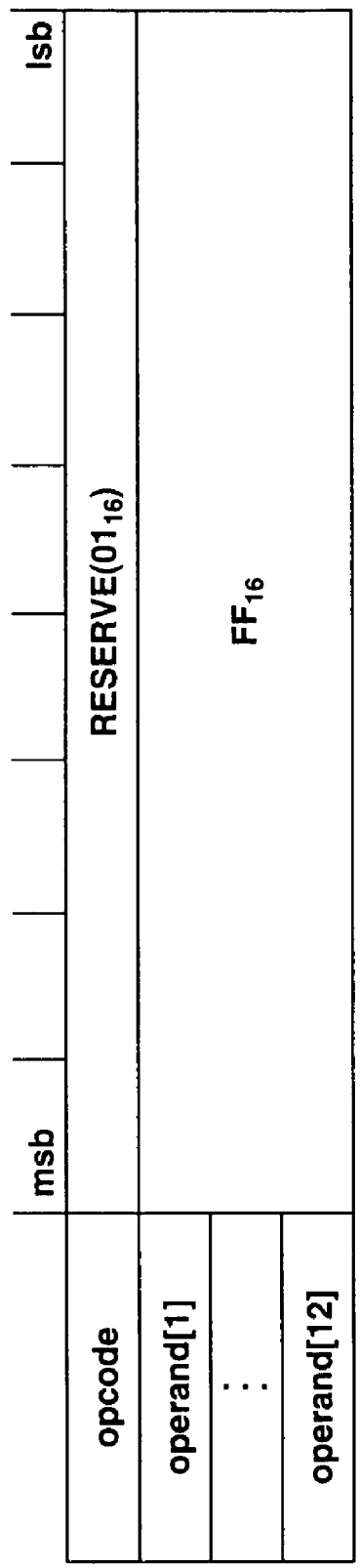
FIG. 16 is a view used in explanation of a format of a reserve status command.

The controller is able to request the present state of reservation by issuing a reserve command having a field of a command type of STATUS shown in FIG. 16.

The AV/C response frame shown in FIG. 10 is also basically constituted similarly to the AV/C command frame shown in FIG. 9, but a response is arranged in place of ctype in FIG. 9. This response means a response code, and values 0 to F represents the meaning shown in FIG. 17. For example, there represents that the value 8 is not adapted (not implemented) to the command request, and that the value 9 accepted the command requested. Further, there represents that the value A rejected the corresponding command.

Figures 17, 18:
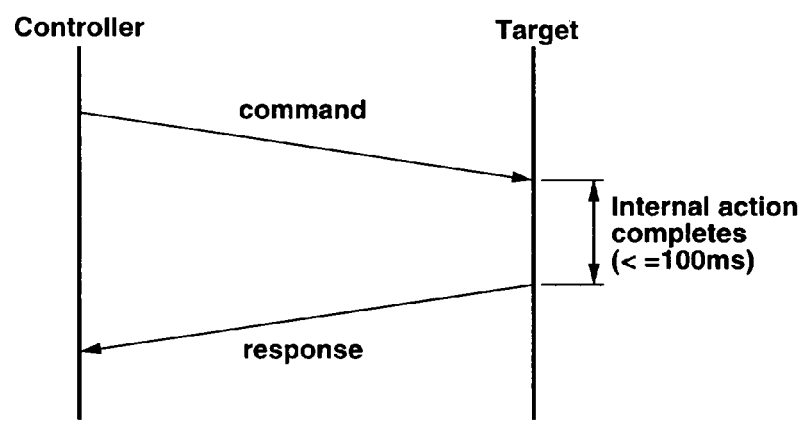
FIG. 17 is a view used in explanation of a response code.
FIG. 18 is a view used in explanation of a quick transaction of AV/C.

As shown in FIG. 18, when a controller issues an AV/C command to a target, the target issues it where a response can be issued within 100 ms to the command.

Figure 19:
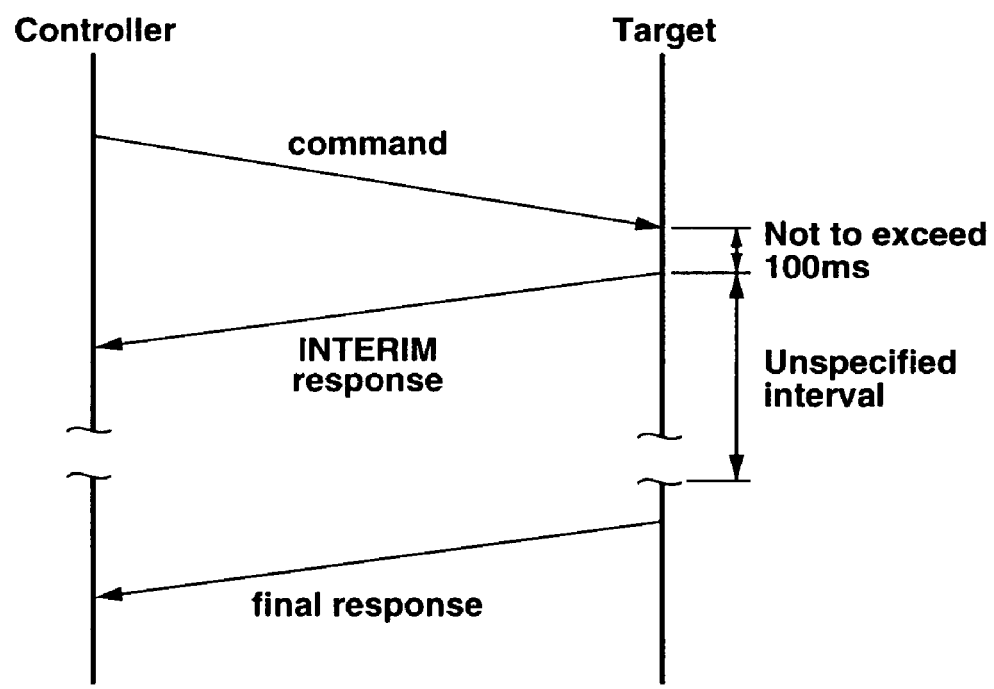
FIG. 19 is a view used in explanation of a delayed transaction of AV/C.
Figure 21:
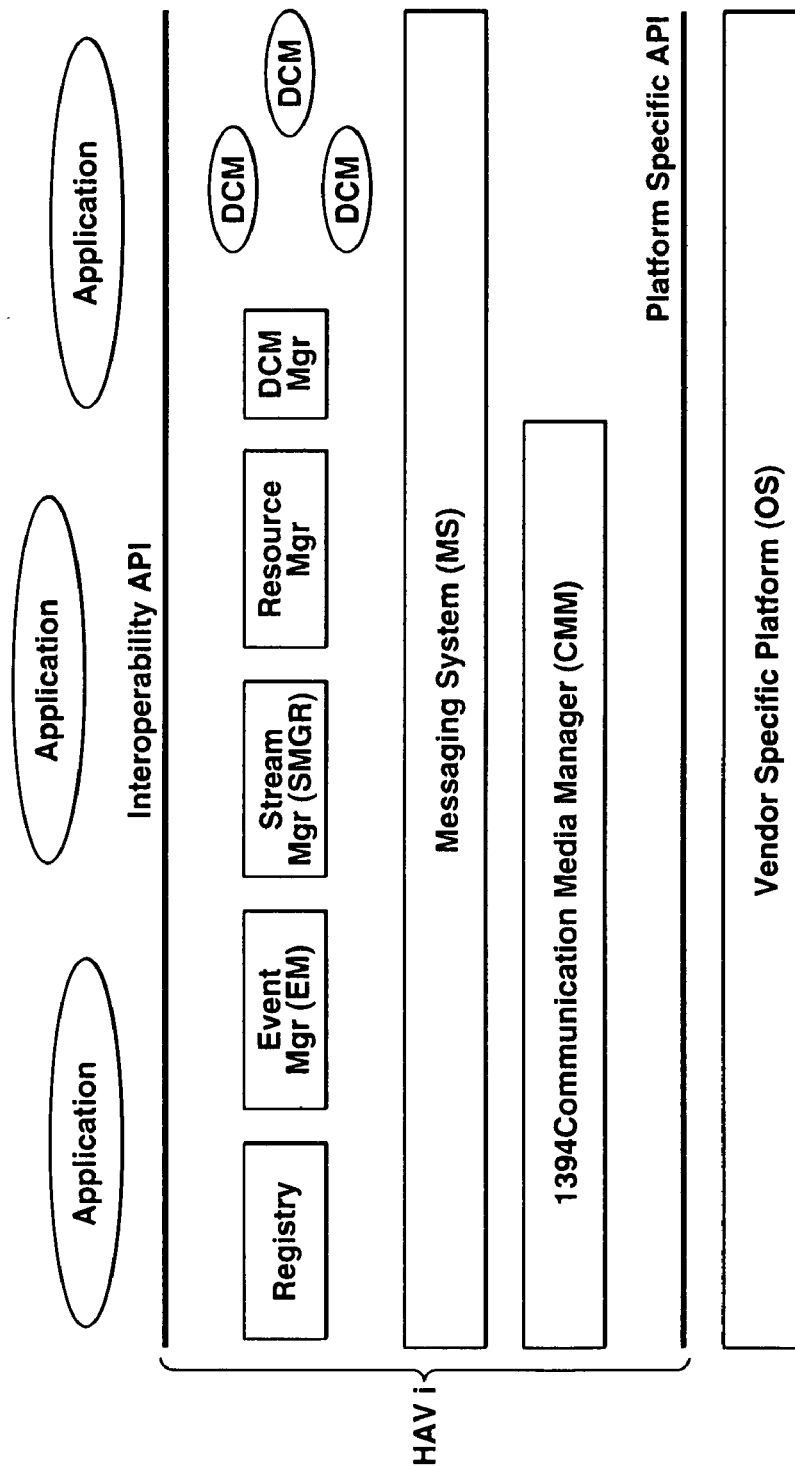
FIG. 21 is a view used in explanation of main software elements defined in the HAVi basic specification.
Figure 23:
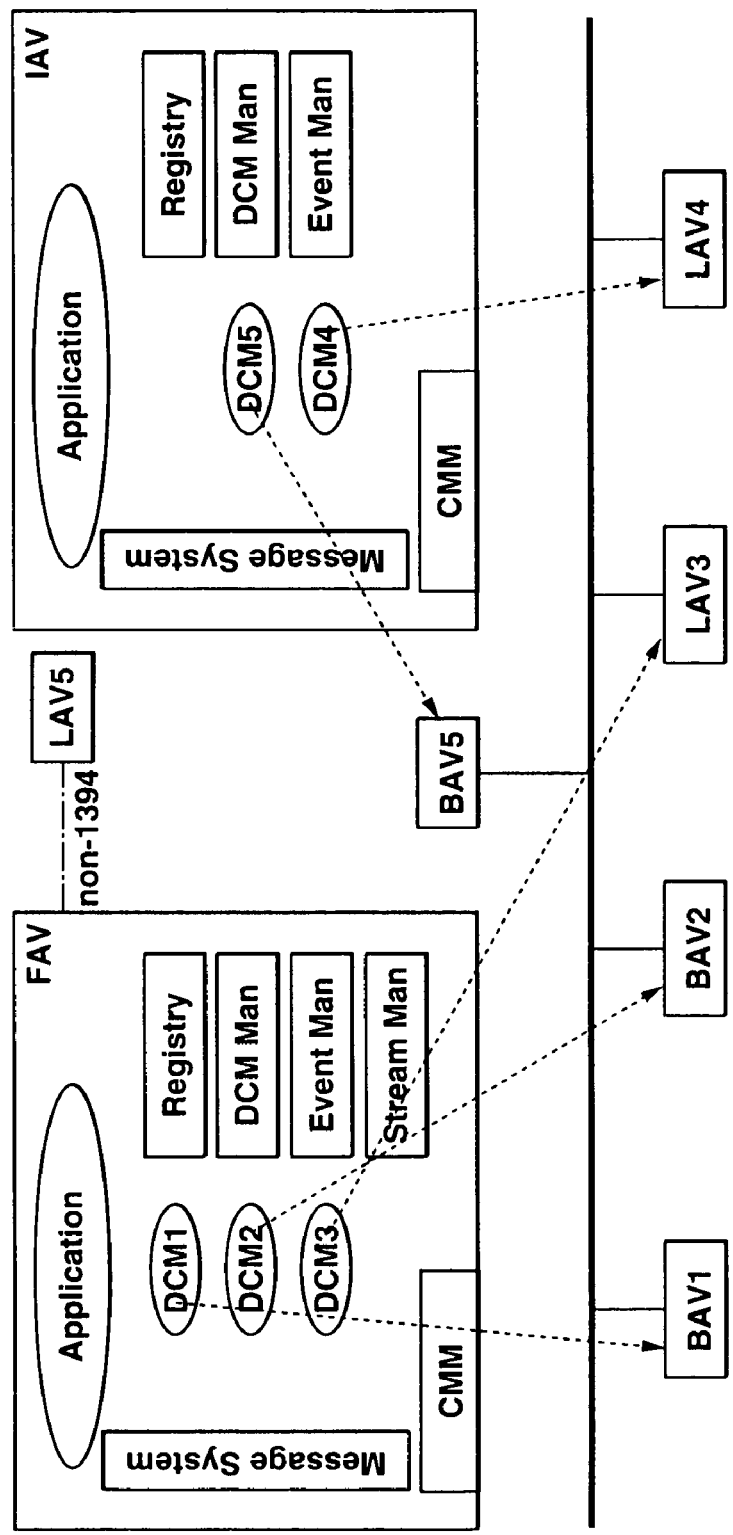
FIG. 23 is a view showing a constitutional example where devices of four categories, FAV, IAV, BAV, and LAV are connected to an IEEE1394 bus.
Figure 24:
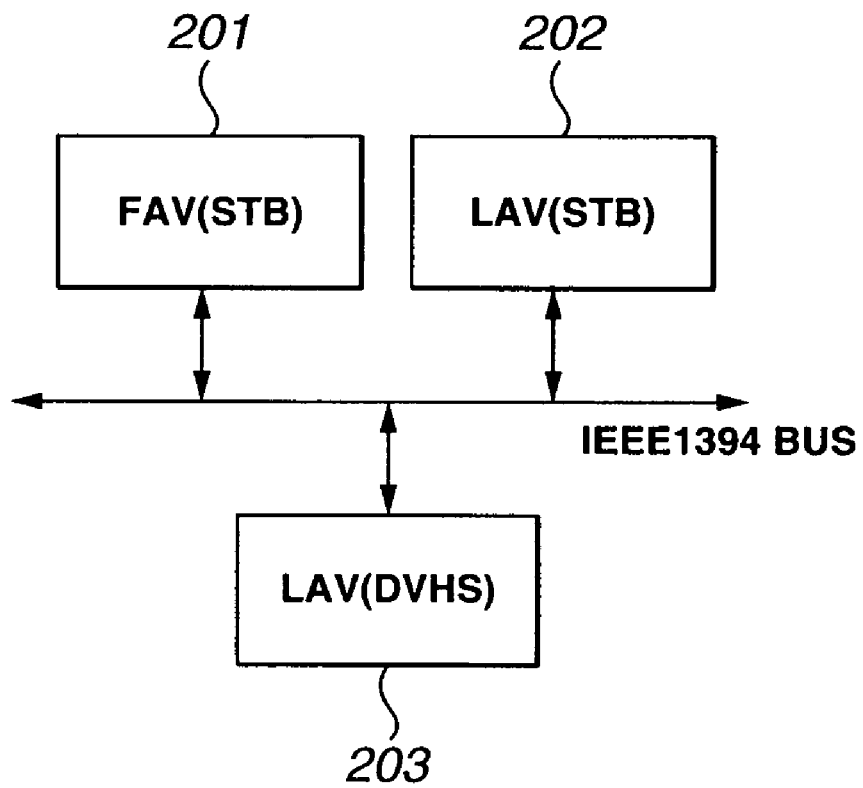
FIG. 24 is a view used in explanation of problems where a FAV controller and an LAV controller in conformity to HAVi on a network.

On the other hand, as shown in FIG. 19, where after receipt of a command, corresponding processing cannot be completed within 100 ms, an INTERIM response is issued before 100 ms pass. Afterwards, when the processing is completed, the target issues a final response.

In the following, a medium used for the purpose of installing a program for executing a series of processings described above, for example, in a computer to place it executable by the computer will be described with reference to FIG. 20 taking as an example the case where the computer is a general-use personal computer.

A program can be presented for a user in the state being preinstalled in a hard disc 302 and a semiconductor memory 303 as a recording medium housed in a personal computer, as shown in FIG. 20A.

Alternatively, a program may be stored temporarily or permanently in recording media such as a floppy disc 311 shown in FIG. 20B, CD-ROM (Compact Disc-Read Only Disc) 312 shown in FIG. 20C, MO (Magneto-Optical) disc 313. shown in FIG. 20D, DVD (Digital Versatile Disc) 314 shown in FIG. 20E, a magnetic disc 315 shown in FIG. 20F, and a semiconductor memory 316 shown in FIG. 20G, and can be presented as a package software.

Further, the program can be, as shown in FUG, 20H, transferred by way of wireless from a download site 321 to a personal computer 323 through a man-made satellite 322 for digital satellite broadcasting, and transferred by way of wire to a personal computer 301 through a network 331 such as a local area network and an internet; and in the computer 301, the program can be stored in a hard disc 302 housed therein.

The medium termed in the present embodiment means a conception in a broad sense including all these media.

It is noted in the present embodiment that the steps of described programs presented by the media include a processing carried out in a manner of time series in order described, of course, and a processing executed in parallel or individually even not always being processed in a manner of time series.

INDUSTRIAL APPLICABILITY

According to the control apparatus and method, medium of the present invention, the using circumstances of a control object device is detected, and control of the control object device is carried out on the basis of the detected result, whereby even where for example, a control apparatus in conformity to a fixed standard, a control apparatus not in conformity to a fixed standard, and a control object device that can be controlled by the respective control apparatuses are mixed, for example, on a network, there can be avoided inconvenience the control object devices not in conformity to a fixed standard are controlled by the respective control apparatuses simultaneously.

What is claimed is:

1. An information processing device for transmitting and receiving information to and from electronic equipment through a network comprising:

type information obtaining means for obtaining type information of said electronic equipment;

operation state value obtaining means for obtaining an operation state value of said electronic equipment on the basis of said type information obtained by said type information obtaining means;

reservation determining means for determining the presence or absence of reservation rights relative to said electronic equipment;

change information storing means for storing change frequency within a fixed time of the operation state value of said electronic equipment obtained by said operation state value obtaining means;

control enablement/disablement judging means for judging enablement/disablement of control of said electronic equipment, wherein said control enablement/disablement judging means judges enablement/disablement of control of said electronic equipment on the basis of the presence or absence of reservation rights of said electronic equipment determined by said reservation determining means, and when said reservation determining means determines the absence of reservation rights of said electronic equipment, said control enablement/disablement judging means additionally judges enablement/disablement of control of said electronic equipment on the basis of the change frequency information stored by said change information storing means, wherein when the type information of said electronic equipment obtained by said type information obtaining means is recording and/or reproducing equipment, said control enablement/disablement judging means judges enablement/disablement of control of said electronic equipment on the basis of the change frequency stored by said change information storing means;

device controlling means for controlling electronic equipment connected with said network, wherein when control enablement is judged by said control enablement/disablement judging means, said device controlling means executes controlling said electronic equipment; and alarm signal producing means for producing a warning signal when control disablement is judged by said control enablement/disablement judging means to display said warning signal.

2. The information processing device according to claim 1 wherein said control enablement/disablement judging means judges enablement/disablement of control of said electronic equipment on the basis of ON/OFF information of a power supply of said electronic equipment obtained by said operation state value obtaining means.

3. The information processing device according to claim 1 wherein said network comprises an IEEE 1394 bus.

4. The information processing device according to claim 1 wherein said electronic equipment includes at least a digital versatile disc device, a digital video cassette recorder, a tape recorder, a compact disc device, and a minidisc device.

5. The information processing device according to claim 1 wherein said operation state value is a control state value of the disc device, a control state value of the tape device, or a control state value of a semiconductor device.

6. The information processing device according to claim 1 wherein said operation state value is a counter value of a recording passage time, or a reproducing passage time counter value.

7. The information processing device according to claim 1 wherein said operation state value is a tape counter value, a frame value, a field value, a track value, a chapter number, a recording passage time, or a reproducing passage time.

8. The information processing device according to claim 1 wherein when the type information of said electronic equipment obtained by said means for obtaining type information is office selection equipment, said control enablement/disablement means judges enablement/disablement of control of said electronic equipment on the basis of an office number obtained by said means for obtaining operation state value.

9. The information processing device according to claim 8 wherein the type information of said electronic equipment obtained by said means for obtaining type information is a TV set, a tuner, a radio set, or a set top box.

10. An information processing method for transmitting and receiving information to and from electronic equipment through a network comprising:

obtaining type information of said electronic equipment;

obtaining an operation state value of said electronic equipment based on said type information;

determining the presence or absence of reservation rights relative to said electronic equipment;

storing change frequency within a fixed time of the operation state value of said electronic equipment obtained by said step of obtaining operation state value;

judging enablement/disablement of control of said electronic equipment, wherein said judging is performed on the basis of the presence or absence of reservation rights of said electronic equipment determined by said determining step, and when said determining step determines the absence of reservation rights of said electronic equipment, said judging step additionally judges enablement/disablement of control of said electronic equipment on the basis of the change frequency information stored by said storing step, wherein when the type information of said electronic equipment obtained by said obtaining step relates to recording and/or reproducing equipment, said judging step judges enablement/disablement of control of said electronic equipment on the basis of the change frequency stored by said storing step;

controlling electronic equipment connected with said network, when control enablement is judged as a result of said judging step;

producing a warning signal based on the judging step.

11. The information processing method according to claim 10 wherein in said control enablement/disablement judgment, enablement/disablement of control of said electronic equipment is judged on the basis of ON/OFF information of a power supply of said electronic equipment obtained.

12. The information processing method according to claim 10 wherein said network comprises an IEEE 1394 bus.

13. The information processing method according to claim 10 wherein said electronic equipment includes at least a digital versatile disc device, a digital video cassette recorder, a tape recorder, a compact disc device, and a minidisc device.

14. The information processing method according to claim 10 wherein said operation state value is a control state value of the disc device, a control state value of the tape device, or a control state value of a semiconductor device.

15. The information processing method according to claim 10 wherein said operation state value is a counter value of a recording passage time, or a reproducing passage time counter value.

16. The information processing method according to claim 10 wherein said operation state value is a tape counter value, a frame value, a field value, a track value, a chapter number, a recording passage time, or a reproducing passage time.

17. The information processing method according to claim 10 wherein when the type information of said electronic equipment is office selection equipment, enablement/disablement of control of said electronic equipment is judged on the basis of an office number obtained in said control enablement/disablement judgment.

18. The information processing method according to claim 17 wherein the type information of said electronic equipment obtained is a TV set, a tuner, a radio set, or a set top box.

19. A program for transmitting and receiving information to and from electronic equipment through a network including:

a step for obtaining type information of said electronic equipment;

a step for obtaining an operation state value of said electronic equipment based on said type information;

a step for determining the presence or absence of reservation rights relative to said electronic equipment;

a step for storing change frequency within a fixed time of the operation state value of said electronic equipment obtained by said step for obtaining an operation state;

a step for judging enablement/disablement of said electronic equipment, wherein said judging is performed on the basis of the presence or absence of reservation rights of said electronic equipment determined by said determining step, and when said determining step determines the absence of reservation rights of said electronic equipment, said judging step additionally judges enablement/disablement of control of said electronic equipment on the basis of the change frequency information stored by said storing step, wherein when the type information of said electronic equipment obtained by said obtaining step relates to recording and/or reproducing equipment, said judging step judges enablement/disablement of control of said electronic equipment on the basis of the change frequency stored by said storing step;

a step for carrying out controlling of said electronic equipment when control enablement is judged as a result of said control enablement/disablement judgment; and a step for producing an alarm signal as a function of the step for judging enablement/disablement.

20. A recording medium having a program for transmitting and receiving information to and from electronic equipment through a network recorded therein;

said program including:

a step for obtaining type information of said electronic equipment;

a step for obtaining an operation state value of said electronic equipment based on said type information;

a step for determining the presence or absence of reservation rights relative to said electronic equipment;

a step for storing change frequency within a fixed time of the operation state value of said electronic equipment obtained by said step for obtaining an operation state;

a step for judging enablement/disablement of said electronic equipment, wherein said judging is performed on the basis of the presence or absence of reservation rights of said electronic equipment determined by said determining step, and when said determining step determines the absence of reservation rights of said electronic equipment, said judging step additionally judges enablement/disablement of control of said electronic equipment on the basis of the change frequency information stored by said storing step, wherein when the type information of said electronic equipment obtained by said obtaining step relates to recording and/or reproducing equipment, said judging step judges enablement/disablement of control of said electronic equipment on the basis of the change frequency stored by said storing step;

a step for carrying out controlling of said electronic equipment when control enablement is judged as a result of said control enablement/disablement judgment; and a step for producing an alarm signal as a function of the step for judging enablement/disablement.

* * * * *